United States Patent
Kazmi

(10) Patent No.: US 9,717,038 B2
(45) Date of Patent: Jul. 25, 2017

(54) USER EQUIPMENT, NETWORK NODE, SECOND NETWORK NODE AND METHODS THEREIN

(75) Inventor: Muhammad Ali Kazmi, Bromma (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 125 days.

(21) Appl. No.: 13/579,680

(22) PCT Filed: Jun. 25, 2012

(86) PCT No.: PCT/SE2012/050709
§ 371 (c)(1),
(2), (4) Date: Aug. 30, 2012

(87) PCT Pub. No.: WO2013/025154
PCT Pub. Date: Feb. 21, 2013

(65) Prior Publication Data
US 2013/0039342 A1    Feb. 14, 2013

Related U.S. Application Data

(60) Provisional application No. 61/522,723, filed on Aug. 12, 2011.

(51) Int. Cl.
*G01R 31/08*    (2006.01)
*H04L 5/14*    (2006.01)
(Continued)

(52) U.S. Cl.
CPC ........ *H04W 48/16* (2013.01); *H04W 36/0088* (2013.01)

(58) Field of Classification Search
CPC .... H04W 80/04; H04W 36/18; H04W 36/001
(Continued)

(56) References Cited

U.S. PATENT DOCUMENTS

2006/0166693 A1    7/2006   Jeong et al.
2007/0105527 A1    5/2007   Nylander et al.
(Continued)

FOREIGN PATENT DOCUMENTS

CN    101278580 A    10/2008
RU    2392742 C2    3/2008
(Continued)

OTHER PUBLICATIONS

Huawei, et al., "Measurement Gap Signalling", 3GPP TSG-RAN WG2 Meeting #73, Feb. 21, 2011, pp. 1-9, R2-111031, 3rd Generation Partnership Project, Taipei, Taiwan.
(Continued)

*Primary Examiner* — Faruk Hamza
*Assistant Examiner* — Abu-Sayeed Haque
(74) *Attorney, Agent, or Firm* — Coats & Bennett, PLLC

(57) ABSTRACT

Embodiments herein relate to a method in a user equipment (10) for acquiring system information relating to a cell (11,14) in a radio communications network. The cell (11,14) is served by a network node (12,12',15) and the user equipment (10) is capable of receiving signals on more than one downlink carrier simultaneously. The user equipment (10) creates autonomous gaps on a downlink carrier, which downlink carrier to use for creating autonomous gaps on is based on a received indication from the network node (12,12',15) and/or a pre-determined rule. The indication or pre-determined rule specifies the downlink carrier. The user equipment (10) then acquires the system information of the cell (11,14) on the downlink carrier using the created autonomous gaps.

39 Claims, 10 Drawing Sheets

(51) Int. Cl.
*H04B 7/00* (2006.01)
*H04J 3/16* (2006.01)
*H04W 48/16* (2009.01)
*H04W 36/00* (2009.01)

(58) Field of Classification Search
USPC .................................................. 370/331
See application file for complete search history.

(56) References Cited

U.S. PATENT DOCUMENTS

| | | | | |
|---|---|---|---|---|
| 2008/0318577 | A1* | 12/2008 | Somasundaram | H04W 36/0066 455/436 |
| 2009/0010219 | A1* | 1/2009 | Lee | H04W 28/20 370/329 |
| 2010/0003979 | A1* | 1/2010 | Iwamura | H04L 1/0025 455/436 |
| 2011/0199908 | A1* | 8/2011 | Dalsgaard | H04W 24/10 370/241 |
| 2011/0243056 | A1* | 10/2011 | Jen | H04L 5/0007 370/312 |
| 2012/0113825 | A1* | 5/2012 | Baglin | H04W 24/00 370/252 |
| 2012/0115463 | A1* | 5/2012 | Weng | H04L 1/0026 455/425 |

FOREIGN PATENT DOCUMENTS

| | | |
|---|---|---|
| WO | 2005078962 A1 | 2/2005 |
| WO | 2008059994 A1 | 5/2008 |
| WO | 2011041662 A1 | 4/2011 |

OTHER PUBLICATIONS

Ericsson et al., "Remaining Issues on RRM Requirements", 3GPP TSG-RAN WG4 Meeting #59AH, R4-113614, Bucharest, Romania, Jun. 27-Jul. 1, 2011; Mobile Competence Center, 650, Route Des Lucioles, F-06921 Sophia-Antipolis Cedex, France; vol. RAN WGR, No. Roma; 20110627; Jun. 22, 2011, XP 050542768, retrieved on Jun. 22, 2011.

3rd Generation Partnership Project; Technical Specification Group Radio Access Network; Evolved Universal Terrestrial Radio Acccess (E-UTRA); Radio Resource Control (RRC); Protocol Specification (Release 10); 3GPP TS 36.331 V10.2.0 (Jun. 2011) pp. 1-1879. 650 Route des Lucioles—Sophia Antipolis, Valbonne, France.

3rd Generation Partnership Project; Technical Specification Group Radio Access Network; Radio Resource Control (RRC); Protocol Specification (Release 10) 3GPP TS 25.331 V10.4.0 (Jun. 2011) pp. 1-200; 650 Route des Lucioles—Sophia Antipolis, Valbonne, France.

3rd Generation Partnership Project; Technical Specification Group Radio Access Network; Universal Terrestrial Radio Acccess (UTRA) and Evolved Universal Terrestrial Radio Acccess (E-UTRA); Radio Measurement Collection for Minimization of Drive Tests (MDT); Overall Description; Stage 2 (Release 10); 3GPP TS 37.320 V10.2.0 (Jun. 2011); pp. 1-17; 650 Route des Lucioles—Sophia Antipolis, Valbonne, France.

* cited by examiner

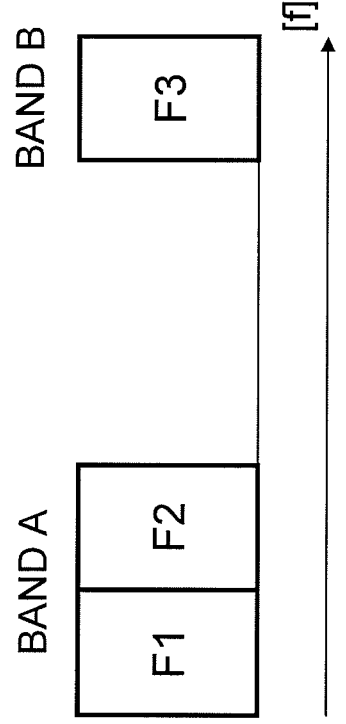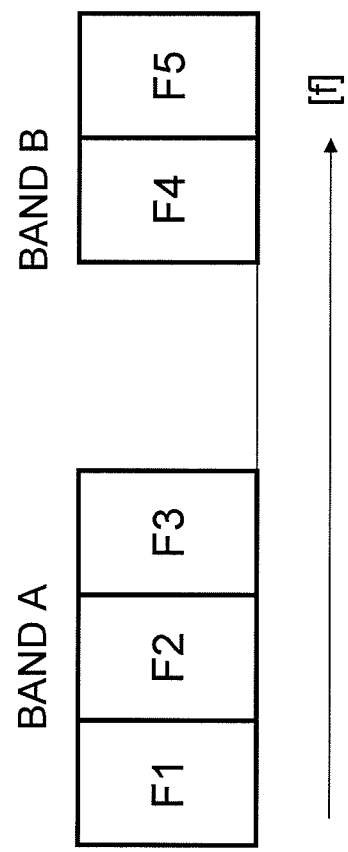

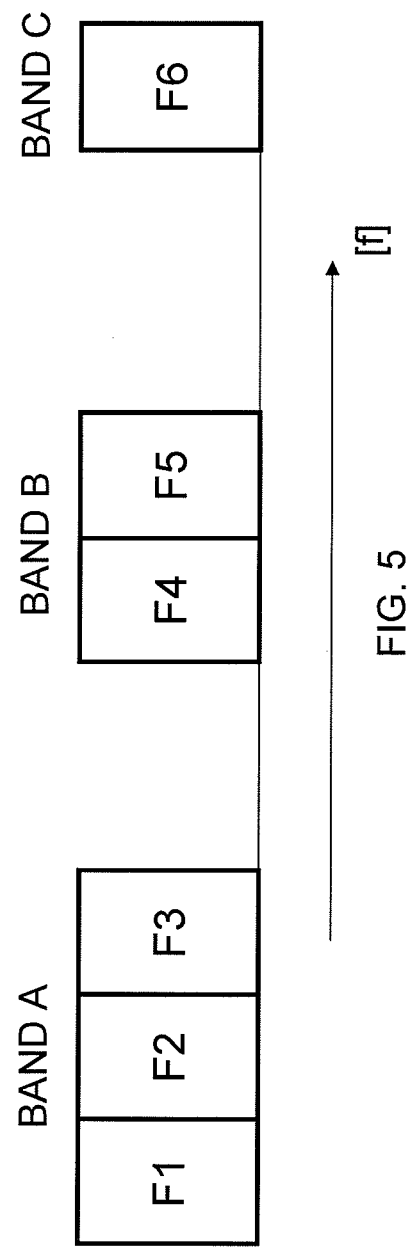

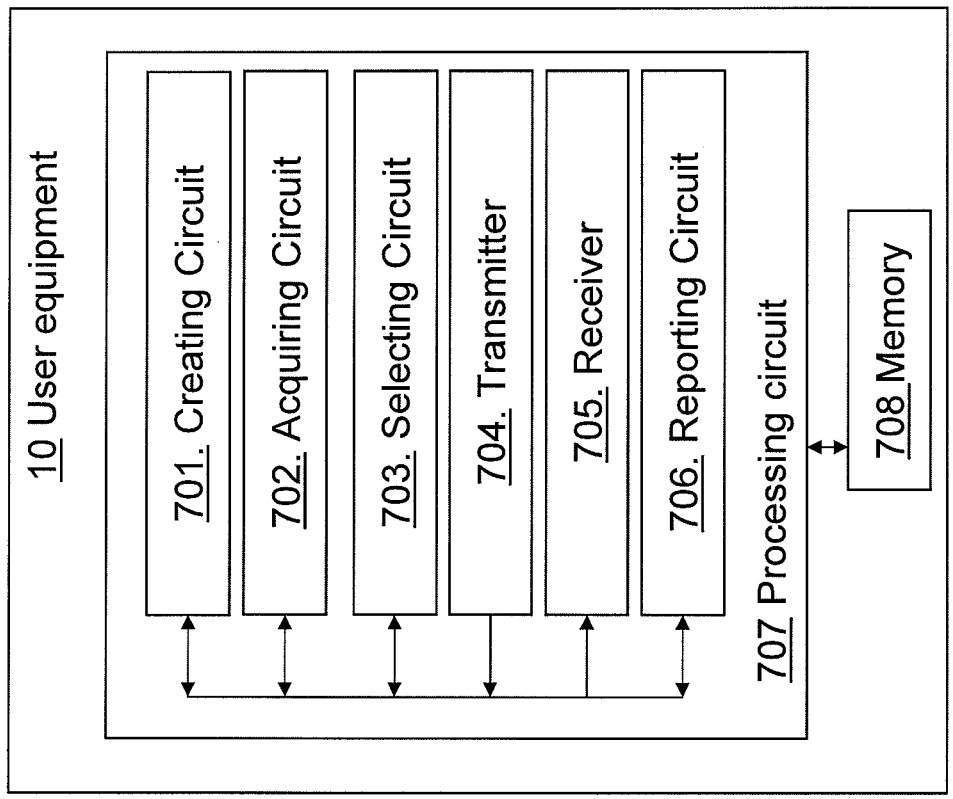
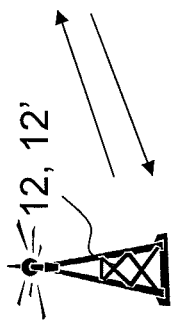
Fig. 7

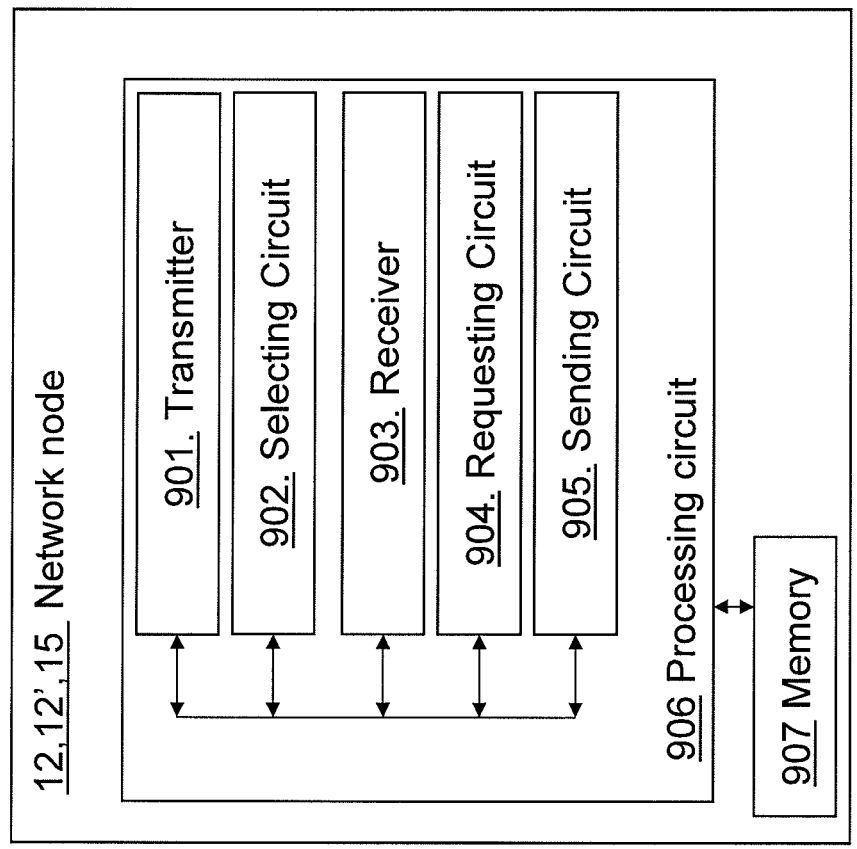
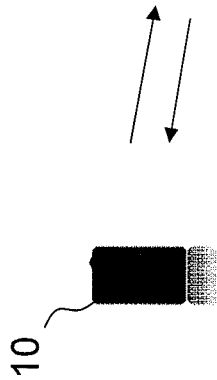
Fig. 9

USER EQUIPMENT, NETWORK NODE, SECOND NETWORK NODE AND METHODS THEREIN

TECHNICAL FIELD

Embodiments herein relate to a user equipment, a network node, a second network node, and methods therein. In particular some embodiments herein relate to acquire or requesting to acquire system information relating to a cell, and handling autonomous gap information.

BACKGROUND

In today's radio communications networks a number of different technologies are used, such as Long Term Evolution (LTE), LTE-Advanced, Wideband Code Division Multiple Access (WCDMA), Global System for Mobile communications/Enhanced Data rate for GSM Evolution (GSM/EDGE), Worldwide Interoperability for Microwave Access (WiMax), or Ultra Mobile Broadband (UMB), just to mention a few possible implementations. A radio communications network comprises radio base stations providing radio coverage over at least one respective geographical area forming a cell. The cell definition may also incorporate frequency bands used for transmissions, which means that two different cells may cover the same geographical area but using different frequency bands. User equipments (UE) are served in the cells by the respective radio base station and are communicating with respective radio base station. The user equipments transmit data over an air or radio interface to the radio base stations in uplink (UL) transmissions and the radio base stations transmit data over an air or radio interface to the user equipments in downlink (DL) transmissions.

The WCDMA/High Speed Packet Access (HSPA) and LTE technologies have further evolved and are constantly evolving towards multi-carrier systems. A multi-carrier user equipment, which has multiple receivers or a wide band receiver, is typically able to measure on inter-frequency carriers without gaps. However such user equipments may still require measurement gaps, i.e. only receiving signals for performing measurements on, for performing measurements on inter-Radio Access Technology (RAT) carriers and also on the additional inter-frequency carriers. Inter meaning different frequencies. The additional inter-frequency carriers are those which cannot be measured without gaps. For example in Dual Cell High Speed Uplink Packet Access (DC-HSUPA), the user equipment may measure on a secondary DL carrier, which is adjacent to a primary DL carrier without gaps. But the same user equipment requires gaps to measure on inter-frequency carrier which is non-adjacent to the primary DL carrier or belong to another band, e.g. a Band B if the user equipment supports band B. In prior art multi-carrier system when the user equipment is requested to read target cell's system information the autonomous gaps are created by the user equipment on the primary DL carrier or Primary Cell (PCell). The autonomous gaps are created on the primary DL carrier even if the user equipment is Carrier Aggregation (CA) capable and has multiple receiver chains e.g. inter-band CA. In this case the primary DL carrier and the secondary DL carrier operate on different bands e.g. the primary DL carrier and the secondary DL carrier on band A and band B respectively using separate chains. For example in prior art even if the user equipment reads system information of the target cell on the secondary DL carrier the autonomous gaps are always created on the primary DL carrier. Thus, today user equipments perform retrieval of System information during measurement gaps, e.g. autonomous gaps, on the primary DL carrier, which retrieval causes interruption in the data retrieval on the primary DL carrier. Thus, the experienced performance of the radio communications network is reduced.

SUMMARY

An object of embodiments herein is to improve the performance of the radio communications network.

The object is achieved by a method in a user equipment for acquiring system information relating to a cell in a radio communications network. The cell is served by a network node, such as a radio base station or an Operation and Maintenance node. The user equipment is capable of receiving signals on more than one downlink carrier simultaneously, e.g. being a multi carrier user equipment or a carrier aggregation user equipment. The user equipment creates autonomous gaps on a downlink carrier. The downlink carrier to use for creating autonomous gaps on, is based on a received indication from the network node and/or a pre-determined rule. The indication or pre-determined rule thus specifies the downlink carrier. The user equipment then acquires the system information of the cell on the downlink carrier using the created autonomous gaps.

According to another aspect the object is achieved by providing a method in a network node, e.g. a first network node or a second network node, for requesting the user equipment to acquire system information relating to the cell in the radio communications network. The cell is served by the network node and as stated above the user equipment is capable of receiving signals from more than one downlink carrier simultaneously. The network node transmits the indication to the user equipment. The indication specifies a downlink carrier to create autonomous gaps for the user equipment to acquire system information relating to the cell.

According to yet another aspect the object is achieved by providing a method in a second network node, such as an Operation and Maintenance node, for handling autonomous gap information from a user equipment or a first network node, such as the radio base station. The autonomous gaps are created by the user equipment for acquiring system information relating to a cell in the radio communications network. The cell is served by the first network node, and the user equipment is capable of receiving signals from more than one downlink carrier simultaneously. The second network node acquires from the user equipment or the first network node information of a capability, of the user equipment, to create autonomous gaps on a downlink carrier. The gaps are for acquiring system information. The second network node further, additionally or alternatively, receives information specifying a downlink carrier on which the user equipment is to create autonomous gaps for acquiring system information of a cell. The second network node then uses the information of the capability and/or the downlink carrier to configure a downlink carrier for one or more of: requesting the user equipment to acquire system information after the handover or cell change; configuring one or more physical layer parameter depending upon whether autonomous gaps are created or not on a certain downlink carrier for acquiring system information; selecting configuration parameters related to positioning measurements on a carrier depending upon whether autonomous gaps are created or not on the carrier; network performance monitoring; network planning or deployment; and a radio management task.

According to still another aspect the object is achieved by a user equipment for acquiring system information relating to a cell in a radio communications network, The cell is served by a network node and the user equipment is configured to receive signals on more than one downlink carrier simultaneously. The user equipment comprises a creating circuit configured to create autonomous gaps on a downlink carrier. The downlink carrier to use for creating autonomous gaps on is based on a received indication from the network node and/or a pre-determined rule. The indication or pre-determined rule specifies the downlink carrier. The user equipment further comprises an acquiring circuit configured to acquire the system information of the cell on the downlink carrier using the created autonomous gaps.

According to yet another aspect the object is achieved by a network node for requesting a user equipment to acquire system information relating to a cell in a radio communications network. The network node is configured to serve the cell and the user equipment is capable of receiving signals from more than one downlink carrier simultaneously. The network node comprises a transmitter configured to transmit an indication to the user equipment. The indication specifies a downlink carrier to create autonomous gaps for the user equipment to acquire system information relating to the cell. The network node thereby requests the user equipment to acquire system information relating to the cell.

According to yet another aspect the object is achieved by a second network node for handling autonomous gap information from a user equipment or a first network node. The autonomous gaps are created by the user equipment for acquiring system information relating to a cell in a radio communications network. The cell is served by the first network node and the user equipment is capable of receiving signals from more than one downlink carrier simultaneously. The second network node comprises an acquiring circuit configured to acquire, from the user equipment or the first network node, information of a capability, of the user equipment, to create autonomous gaps on a downlink carrier. The autonomous gaps are for acquiring system information. The acquiring circuit is additionally or alternatively configured to acquire information specifying a downlink carrier on which the user equipment is to create autonomous gaps for acquiring system information of a cell. The second network node further comprises a using circuit configured to use the information of the capability and/or the downlink carrier to configure a downlink carrier for one or more of: requesting the user equipment to acquire system information after the handover or cell change; configuring one or more physical layer parameter depending upon whether autonomous gaps are created or not on a certain downlink carrier for acquiring system information; selecting configuration parameters related to positioning measurements on a carrier depending upon whether autonomous gaps are created or not on the carrier; network performance monitoring; network planning or deployment; and a radio management task.

Embodiments herein enable flexibility to the network node to specify the downlink carrier, such as carrier frequency and/or frequency band, over which the user equipment creates the autonomous gaps for reading the system information of the cell. Also, the situation where the autonomous gaps are always created on a certain DL carrier carrying important information, such as a serving carrier or a primary carrier, leading to data interruption or loss on the certain DL carrier, is prevented. Thus, the experienced performance as well as the real performance of the radio communications network is improved.

BRIEF DESCRIPTION OF THE DRAWINGS

Embodiments will now be described in more detail in relation to the enclosed drawings, in which:

FIG. 3 shows allocated bandwidth of a multi-carrier UE supporting 3 DL carriers, FIG. 4 shows allocated bandwidth of a multi-carrier UE supporting 5 DL carriers in 2 bands, FIG. 5 shows allocated bandwidth of a multi-carrier UE supporting 6 DL carriers in 3 bands, FIG. 7 is a block diagram depicting the user equipment according to some embodiments herein, FIG. 9 is a block diagram depicting the network node according to some embodiments herein.

DETAILED DESCRIPTION

Figure 1:
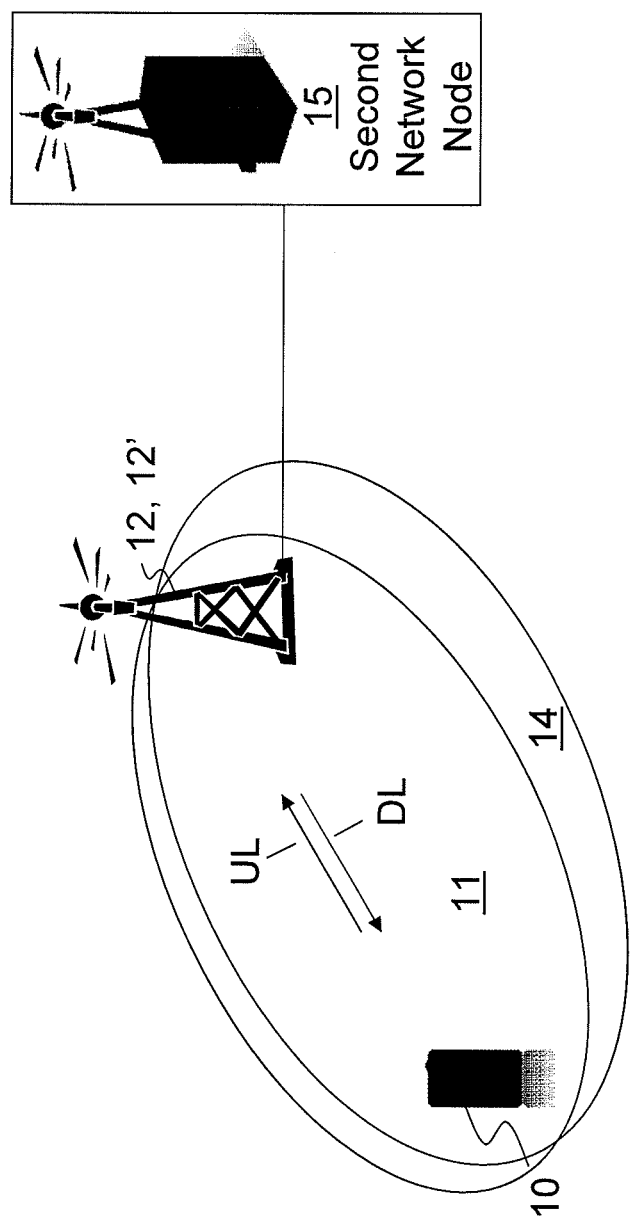
FIG. 1 is a block diagram depicting a radio communications network.

FIG. 1 is a schematic overview of a radio communications network such as a LTE, LTE-Advanced, WCDMA, GSM/EDGE, WiMax, Code Division Multiple Access 2000 (CDMA2000), or UMB, network just to mention a few possible implementations.

The radio communications network comprises a first network node 12, such as a radio base station 12', providing radio coverage over at least one geographical area forming a cell exemplified as a first cell 11. The radio base station 12' may also be referred to as e.g. a NodeB, an evolved Node B (eNB, eNode B), a base transceiver station, Access Point Base Station, base station router, or any other network unit capable to communicate with a user equipment within the cells served by the radio base station 12' depending e.g. of the radio access technology and terminology used. Examples of the radio network node are Radio Network Controller (RNC), relay, base station, donor node, e.g. DeNB etc.

A user equipment 10 is served in the first cell 11 by the radio base station 12' and is communicating with the radio base station 12'. The first cell 11 is a serving or primary cell to the user equipment 10 in this example. The user equipment 10 transmits data over a radio interface to the radio base station 12' in an uplink (UL) transmission and the radio base station 12' transmits data to the user equipment 10 in a downlink (DL) transmission. It should be understood by the skilled in the art that "user equipment" is a non-limiting term which means any wireless terminal, device or node e.g. Personal Digital Assistant (PDA), laptop, mobile, sensor, relay, mobile tablets or even a small base station communicating within respective cell. Thus, in the embodiments the term user equipment may be any type of wireless node which is capable of reading system information (SI) of a cell by creating autonomous gaps. For example the embodiments are equally applicable to embedded devices like wireless integrated card used in computer, plugged in wireless card like Universal Serial Bus (USB) used in computer, mobile relay, wireless terminal acting as relay, wireless terminal used for device to device communication, target device, even Home Base Station (HBS) or femto base station etc. HBS typically has a measurement unit to measure and acquire SI of another cell, e.g. macro cell.

The radio base station 12' provides radio coverage over another geographical area forming a second cell 14, also referred to as a secondary cell. The user equipment 10 is capable of receiving signals on more than one downlink carrier simultaneously, e.g. capable of multi carrier aggregation, and thus the user equipment 10 may increase transmission rate and/or bandwidth towards and/or from the user equipment 10. The second cell 14 may be controlled by a second radio base station or the same radio base station 12'. The radio communications network further comprises a second network node 15, which may be an Operation and Maintenance node (O&M), the second radio base station, or other network nodes. The first and second network nodes 12,12',15 are commonly referred to as a network node. The second network node may further comprises a core network node, e.g. a Mobility Management Entity (MME), access gateway, and/or a positioning node such as any location server, Evolved Serving Mobile Location Centre (E-SMLC) etc.

In embodiments herein, focus is on the aspects of autonomous gap configuration for the user equipment 10, which also may be referred to as measurement gap configuration. The term autonomous means that the network does not know exactly when the gaps are created, and the gaps are used for acquiring SI of the cell. As stated above, the user equipment 10 is capable of receiving signals on more than one downlink carrier simultaneously. This covers user equipments that are multi-carrier capable and carrier aggregation (CA) capable. However, the techniques disclosed herein are also applicable for a user equipment which may not be multi-carrier/CA capable but may still has means, e.g. an additional radio receiver, to perform normal measurements, e.g. inter-frequency LTE Reference Signal Received Power (RSRP)/Reference Signal Received Quality (RSRQ), inter-frequency High-Speed Packet Access (HSPA) Common Pilot Channel (CPICH) measurements, inter-RAT GSM carrier Received Signal Strength Indicator (RSSI) etc, on one or more inter-frequency carriers and/or inter-RAT carriers without measurement gaps or compressed mode patterns. First is a Multi-Carrier or Carrier Aggregation Concept described.

Intra-RAT Carrier Aggregation

To enhance peak-rates within a technology, multi-carrier or carrier aggregation solutions are known. For example, it is possible to use multiple 5 MHz carriers in HSPA to enhance the peak-rate within the HSPA network, and work is ongoing for LTE Release 10 to facilitate aggregation of multiple LTE carriers. Each carrier in multi-carrier or carrier aggregation system is generally termed as a Component Carrier (CC) or sometimes is also referred to as cell. In simple words the CC means an individual carrier in a multi-carrier system. The term Carrier Aggregation (CA) is also interchangeably called e.g. "multi-carrier system", "multi-cell operation", "multi-carrier operation", "multi-carrier" transmission and/or reception. This means the CA is used for transmission of signaling and data in the uplink and downlink directions. One of the CCs is a primary carrier or anchor carrier and remaining ones are called secondary or supplementary carriers. Generally the primary or anchor CC carries the essential UE specific signaling. The primary CC exists in both uplink and direction CA. The network, e.g. the radio base station 12', may assign different primary carriers to different user equipments operating in the same sector or cell.

Thanks to carrier aggregation, the user equipment 10 has more than one serving cell: one primary serving cell and one or more secondary serving cell. The serving cell, e.g. the first cell 11, is interchangeably called as Primary Cell (PCell), Primary Carrier, or Primary Serving Cell (PSC). Similarly the secondary serving cell 14 is interchangeably called as Secondary Cell (SCell) or Secondary Serving Cell (SSC). Regardless of the terminology, the PCell and SCell(s) enable the user equipment 10 to receive and transmit data. More specifically the PCell and Scell exist in DL and UL for the reception and transmission of data by the user equipment 10. The remaining non-serving cells on the PCC and SCC are called neighbor cells.

The CCs belonging to the CA may belong to the same frequency band, a.k.a. intra-band CA, or to different frequency band, a.k.a. inter-band CA, or any combination thereof e.g. 2 CCs in a band A and 1 CC in a band B. The carriers in intra-band CA may be adjacent, a.k.a. contiguous, or non-adjacent, a.k.a. non-contiguous. In non-adjacent intra-band CA, the carriers in the gaps may be used by other operators. Typically in intra-band CA the user equipment 10 may require a single Radio Frequency (RF) receiver chain and an RF transmitter chain for receiving and transmitting the aggregated carriers respectively, especially when the total aggregated carriers are within certain limit e.g. 20 MHz in total for HSPA or 40 MHz in total for LTE. Otherwise the user equipment 10 may have to implement more than one RF transmitter/receiver chains for an aggregated larger number of carriers and particularly in case of non-contiguous CA.

The inter-band CA comprising DL carriers distributed over two bands is also called as Dual-Band-Dual-Carrier-High Speed Downlink Packet Access (DB-DC-HSDPA) in HSPA. Furthermore the CCs in intra-band CA may be adjacent or non-adjacent in frequency domain, a.k.a. intra-band non-adjacent CA. A hybrid CA comprising of intra-band adjacent, intra-band non-adjacent and inter-band is also possible.

In HSPA Release 10, up to 4 DL carriers may be aggregated a.k.a. as 4C-HSDPA where the DL carriers or DL cells may belong to the same frequency band or be split over two different frequency bands e.g. 3 adjacent DL carriers in band I (2.1 GHz) and 1 DL carrier in band VIII (900 MHz). In HSPA Release 11 even up to 8 DL carriers may be aggregated and may be termed as 8C-HSDPA. The DL carriers may be distributed over 2 or even more bands. In the present version of the HSPA and LTE specifications, i.e. Release 10, all the carriers that belong to one frequency band may have to be adjacent when configured by higher layers, e.g. Radio Resource Control (RRC). However the operation on not adjacent carriers within the same band may result from the carrier activation and/or deactivation, which is performed by the lower layers, e.g. Media Access Control (MAC) layer. However as stated above that the non-adjacent carriers within the same band may also be configurable provided that the user equipment 10 supports this capability.

In LTE intra-band CA in principle up to 5 DL carriers and 5 UL carriers each of up to 20 MHz may be aggregated by the user equipment 10. Even additional carriers may be introduced in future releases. At least the UE requirements exist for 2 DL carriers and 2 UL carriers i.e. up to 40 MHz in UL and DL Release 10. The intra-band non-contiguous CA is also possible in LTE both in the DL and UL. The user equipment 10 may use single RF chain or multiple RF chains depending upon the aggregated bandwidth.

In LTE inter-band CA, up to 5 DL and 5 UL carriers each of up to 20 MHz and belonging to different bands may be aggregated by the user equipment 10. Even additional carriers belonging to different bands may be introduced in future releases. At least the UE requirements exist for 2 DL carriers belong to 2 different bands and 1 UL carriers in Release 10. The requirements for 2 UL inter-band CA are being introduced in Release 11. Typically for inter-band CA, the user equipment 10 has independent RF chain for each CC which may belong to different frequency band.

Multi-RAT Multi-Carrier Concept

Using carrier aggregation between carriers of different technologies is also referred to as "multi-RAT carrier aggregation" or "multi-RAT-multi-carrier system" or simply "inter-RAT carrier aggregation". For example, the carriers from WCDMA and LTE may be aggregated. Another example is the aggregation of LTE and CDMA2000 carriers. For the sake of clarity the carrier aggregation within the same technology as described herein may be regarded as 'intra-RAT' or simply 'single RAT' carrier aggregation. In inter-RAT CA, one of the systems may be configured as the primary system and another one or the remaining ones as the secondary system or auxiliary system. The primary system may carry basic signaling and configuration information between the network, such as the radio base station 12', and the user equipment 10.

Multi-Point Carrier Aggregation

The CCs in CA may or may not be co-located in the same site or base station. For instance, the CCs may originate, i.e. transmitted or received, at different locations, e.g. from non-located Base Station (BS) or from BS and Remote Radio Head (RRH) or Remote Radio Unit (RRU). The well-known examples of combined CA and multi-point communication are Distributed Antenna System (DAS), RRH, RRU, Coordinated Multi Point (CoMP) transmission, multi-point transmission or reception etc. Embodiments herein also apply to the multi-point carrier aggregation systems.

As part of developing embodiments herein a problem will first be identified and discussed. In a legacy single carrier system, wherein legacy user equipment such as non-CA capable user equipments exist, the autonomous gaps, or autonomous measurement gaps, to read target cell's SI are created by the legacy user equipment on the serving carrier frequency, which is the only carrier on which the legacy user equipment receives data. As stated above in the background, in prior art multi-carrier system when the legacy user equipment is requested to read target cell's SI the autonomous gaps are created by the user equipment on the primary component carrier (PCC) or PCell. The autonomous gaps are created on the PCC even if the user equipment 10 is CA capable and has multiple receiver chains e.g. inter-band CA. In this case the PCC and SCC operate on different bands e.g. PCC and SCC on band A and band B respectively using separate chains. For example in prior art even if the legacy user equipment reads SI of the target cell on the SCC the autonomous gaps are always created on the PCC.

This means the data interruption due to the autonomous gaps will always occur on the PCell. The data interruption may even occur on the PCell on PCC and also on all SCell(s) on SCCs, which are adjacent to the PCC. This is because the adjacent carriers typically share the same radio part e.g. power amplifier, RF filters. In other words there is common radio chain for adjacent carriers up to certain aggregated bandwidth.

The primary carrier on which autonomous gaps are always created however may typically comprise more important data compared to that on the secondary carriers. For instance the PCell comprises all important control signaling whose interruption and delay should be minimized. Furthermore the primary and one or more secondary carriers may be adjacent in the same band, e.g. 3 carriers including primary in band A and 1 carrier in band B in 4C-HSDPA scenario, whereas remaining secondary carriers may belong to a different band, e.g. 1 carrier in band B. In such scenario there is more impact in terms of the overall data interruption in case the autonomous gaps are configured on band A. This is because the legacy user equipment may have a single broadband receiver for receiving all 3 carriers and as a consequence due to the gaps the transmissions on all adjacent carriers in the same band, i.e. on band A, may be interrupted. This is particularly undesirable in case the carriers on band A carry delay sensitive data e.g. Voice over IP (VOIP) etc.

There is also risk that in prior art the legacy user equipment may create autonomous gaps on all the configured carriers especially when they are adjacent. Certain UE implementation may even create gaps on the secondary bands. This will lead to data interruption not only on the PCell but also on one or more SCells. Hence overall loss of data will be quite substantial when the legacy user equipment reads SI and especially for inter-RAT SI. The SI reading delay for inter-RAT cell is quite long e.g. 1-2 seconds for inter-RAT UTRAN cell.

A user equipment that is non-CA capable may also have multiple radio receivers for performing certain types of measurements, e.g. inter-frequency and/or Inter-RAT measurements. This prevents the use of measurement gaps, i.e. normal measurement gaps in LTE or compressed mode patterns in HSPA, for performing the inter-frequency and/or Inter-RAT measurements. However in prior art the autonomous gaps for SI reading may only be created on the serving carrier frequency. This causes interruption of data on the serving carrier.

According to embodiments herein a method for acquiring SI relating to the cell 11 in the radio communications network is disclosed. Embodiments herein provide means to explicitly specify the downlink carrier, also called DL carrier frequency, over which the user equipment 10 creates the autonomous gaps for reading the SI of the e.g. target intra-, inter-frequency, or inter-RAT cell.

Figure 2:
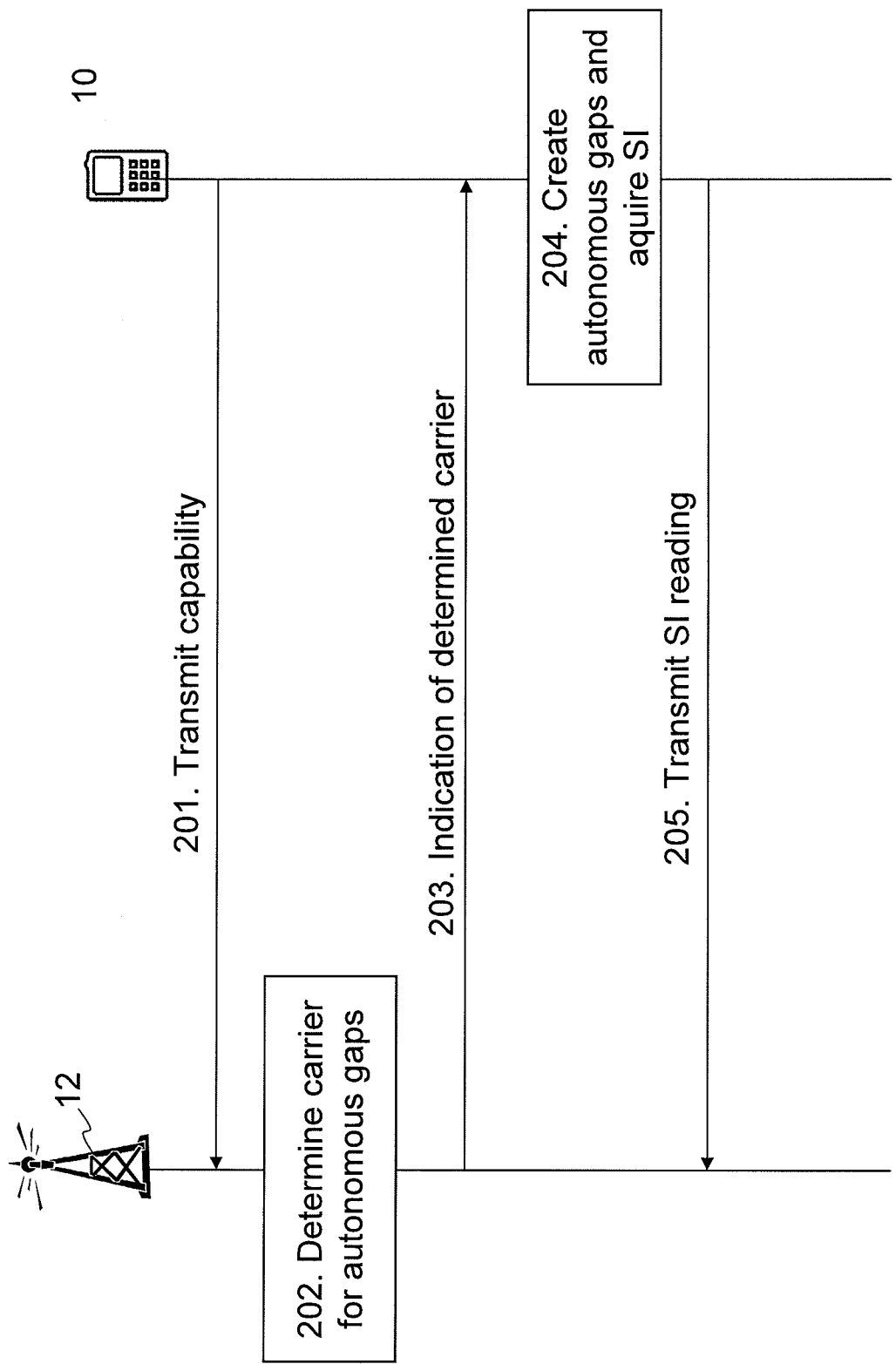
FIG. 2 is a combined flow chart and signaling scheme.

FIG. 2 is a schematic combined flowchart and signaling scheme. The above embodiments will be described in more detail below.

Action 201.

According to some embodiments the user equipment 10 reports its capability, or information of capability, to the network node 12,12',15 that it is capable of creating carrier frequency specific autonomous measurement gaps when acquiring the SI of the target cell. The carrier specific autonomous gaps capability means that the user equipment 10 may create these autonomous gaps when reading the cell's SI on any of the carrier or frequency band and not just on the serving carrier or serving frequency band. Thus, the user equipment 10 may transmit an indicator of a measurement gap capability or a capability to create autonomous gaps on any of the downlink carrier out of the more than one downlink carrier for acquiring system information of a cell. The capability or information about the capability may also be even more extensive. For example the user equipment 10 may indicate that it is capable of creating autonomous gaps on different carriers or bands for reading the SI of different cells at the same time. For example if requested by the network node 12,12',15 the user equipment 10, e.g. supporting inter-band CA assuming band A and band B, creates autonomous gaps on band A for reading SI of intra-frequency cell and on band B for reading SI of inter-frequency cell. This enables faster acquisition of SI reading of the two cells. Furthermore this (advanced) capability enables the user equipment 10 to distribute the autonomous gaps on different carriers or bands. This leads on less data interruption on one carrier. In prior art all gaps would occur on the PCell, i.e. on band A, leading severe interruption on PCell or serving cell.

The capability may be reported for each 'type of SI reading' separately or it may be applicable for all or group of SI readings. The 'type of SI reading' may imply reading SI of intra-frequency cell, inter-frequency cell or inter-RAT cell. The RATs for inter-RAT SI reading using carrier specific autonomous gaps may also be indicated. For example the user equipment 10 may support inter-RAT reading for UTRAN and CDMA2000 when serving cell is E-UTRA.

The capability may also be specific to a RAT. For example a certain UE may indicate that it is capable of reading SI of the intra-frequency and inter-frequency UTRA FDD cell by creating carrier specific autonomous gaps.

The network node 12,12',15 receiving this capability may be any serving radio network node or core network node or even a positioning node.

The signaling of capability to any of the above network nodes may be done using any suitable protocols such as RRC, LTE Positioning Protocol (LPP) etc.

The user equipment 10 may report its capability for reporting occasions by proactive reporting without receiving any explicit request from the network node 12, 12',15, and/or reporting upon receiving any explicit request from the network node 12,12',15.

In case of proactive reporting the user equipment 10 may report its capability during initial setup or call setup e.g. when establishing the RRC connection; during cell change e.g. handover, RRC re-establishment, RRC connection release with re-direction etc; and/or periodic reporting. Action 202.

According to embodiments herein, the network node 12,12',15 which may be the one that requests the user equipment 10 to acquire the SI of the (target) cell 11 determines the downlink carrier, carrier frequency or frequency band on which the user equipment 10 should create autonomous gaps when reading the SI. The network node 12,12',15 may also additionally determine the cell, i.e. in addition to the downlink carrier, on which the user equipment 10 should create autonomous gaps when reading the SI. A cell operates on certain carrier frequency, which belongs to certain frequency band. In multi-cell environment several cells operate on a carrier. In TDD the downlink and uplink carriers are the same. But in FDD the downlink and uplink carriers are different. A cell is identified by at least two parameters: cell identifier and the downlink carrier frequency on which the cell operates. This is because available Physical Cell Identifiers (PCIs) are limited, e.g. 504 in LTE, and therefore PCIs are typically reused on different carrier frequencies.

The network node 12,12',15 may use at least the received capability information about the capability, described above, if this is available and it may further use additional criteria when selecting the downlink carrier and also the cell on which the user equipment 10 should create the autonomous gaps when reading the SI of the target cell. The selected downlink carrier may be different for different type of SI reading, i.e. intra-, inter-frequency or inter-RAT etc.

Embodiments herein are mainly network implementation related. However based on suitable criteria, the network node 12,12',15 may request the user equipment 10 to create the autonomous gaps on the indicated carrier, i.e. selected by the network node 12, for reading the SI of the requested cell. Action 203.

The network node 12,12',15 then transmits the indication indicating or specifying the selected downlink carrier. Thus, the user equipment 10 receives from the network node 12,12',15 the information related to the downlink carrier over which the user equipment 10 is to create the autonomous gaps for acquiring the SI of at least one cell. The user equipment 10 may additionally receive the cell information, e.g. cell ID, CGI etc, on the indicated downlink carrier over which the autonomous gaps are created The network node 12,12',15 may configure the user equipment 10 to create autonomous gaps on a particular downlink carrier for reading the SI of the target cell. The indication may be sent in terms of carrier frequency number, e.g. UTRA Absolute Radio Frequency Channel Number (UARFNC) in HSPA or E-UTRA Absolute Radio Frequency Channel Number (EARFCN) in LTE, and/or band indicator or any other relevant frequency information. The indication sent by the network node 12,12',15 may also additionally comprise of the cell identifier of the cell, e.g. PCI, CGI etc, on the indicated carrier on which the autonomous gaps are to be created by the user equipment 10. The frequency number may correspond to that of the DL carrier and/or UL carrier.

The indication may also be expressed in terms of only frequency bands over which the user equipment 10 should create the autonomous gaps e.g. for user equipment 10 with inter-band CA with carriers on 2 frequency bands, e.g. band A and band B, the user equipment 10 may be requested to configure gaps on band B. Then it may be up to the user equipment 10 over which specific downlink carrier in the indicated band it should create the autonomous gaps. Alternatively the frequency in the indicated band may also be decided based on pre-determined rule e.g. first frequency in the band.

The indication may also be sent in terms of cell ID especially in case of multi-carrier. For example the network node 12,12',15 may indicate that user equipment 10 is to create autonomous gaps only on the SCell. In another example the user equipment 10 may be permitted to created autonomous gap on any of the SCell in case there are more than one SCell. In the latter case the user equipment 10 may also indicate back to the network node 12,12',15 the SCell on which it creates the gaps for SI reading.

Another possibility is that the network node 12,12',15 may also indicate the user equipment 10 whether frequency specific autonomous gaps are to be used or not by the user equipment 10 when reading SI of the target cell. This indicator enables activation or deactivation of the use of the autonomous gaps by the user equipment 10 for reading the target cell's SI as explained with example. For instance when autonomous gaps for a specific downlink carrier are not required to be used by the user equipment 10 then the user equipment 10 may create autonomous gaps on the serving/primary carrier or even on more than one carrier or band, e.g. PCC and SCC. But when autonomous gaps, carrier/frequency specific, are required to be used then user equipment 10 is allowed to create autonomous gaps only on a specific downlink carrier which is indicated by the network node 12,12',15 or which is decided based on a pre-determined rule.

The indication may be sent by the network node 12,12',15 to the user equipment 10 separately for the SI reading of each target cell in case SI of more than one cell is required to be read by the user equipment 10. The indicated downlink carrier and the associated autonomous gaps may be linked to the SI reading of a particular type of cell: intra-frequency, inter-frequency and/or inter-RAT. The indication may be applicable for all types of SI readings.

The network node 12,12',15 may use RRC signaling or any other suitable protocol for providing the indication and also e.g. along with a request for SI reading. However other means of signaling e.g. layer 2 or MAC layer may also be used to provide this indication to the user equipment 10.

Action 204.

The user equipment 10 interprets the received indication or information. The user equipment 10 then creates the autonomous gaps on the indicated downlink carrier and e.g. on indicated cell, if included in received information, for acquiring the SI of at least one target cell as determined from the received indication.

Upon receiving the indication and/or any relevant frequency/band information from the network node 12, the user equipment 10 thus creates the autonomous gaps on the indicated downlink carrier and reads the SI of the target cell as e.g. requested by the network node 12. For example, if the user equipment 10 only supports inter-band CA (band A and band B) the user equipment 10 may create autonomous gaps only on band B for reading the target cell SI if this is indicated by the serving network node 12.

The user equipment 10 may select which DL carrier to use based pre-determined rules for selecting DL carrier to create autonomous gaps on or a combination of network configuration and the pre-determined rules, see below.

Action 205.

The user equipment 10 then reports the read SI e.g. at least one measurement reporting comprising at least the acquired SI information of at least one cell, i.e. during autonomous gaps, as requested by the network node 12. Thus, after performing the SI reading, using autonomous gaps, the user equipment 10 sends the acquired SI to the network node 12, e.g. the serving node or the node requested to do measurements as described earlier.

The embodiments herein may also apply to a user equipment which may not be multi-carrier/CA capable, i.e. receives data only on one DL carrier, but has means to perform measurements on one or more inter-frequency or inter-RAT carrier without measurement gaps. Such a UE typically has an additional receiver chain and may thus be able to receive signals on more than one downlink carrier simultaneously. Consider the user equipment 10 as a UE which is able to receive data only on one downlink carrier but is also able to measure on another downlink carrier without measurement gaps e.g. F1 is the serving carrier and F2 may be measured without gaps but no data can be received in F2 by the user equipment 10. Hence in this example the signaling means may enable the network node 12,12',15 to specify that the user equipment 10 creates the autonomous gaps for reading SI of the target cell on F2 i.e. using the additional radio chain which is used only for measurement. In this way there will not be any loss of data on the serving carrier F1. As stated earlier that in prior art the autonomous gaps are always configured on F1 leading to loss of data.

The method of configuring the user equipment 10 to create autonomous gaps on a particular downlink carrier (and also cell) for reading the SI of the target cell capability information may also be implemented in a test system which comprises of at least test equipment (TE) node (aka system simulator (SS)). The test system may signal this information to user equipment 10 for testing purposes for verifying that user equipment 10 is capable of creating frequency specific autonomous gaps for SI reading. For example the test may be a signaling/protocol/procedure test case or a performance/RRM test case to verify that user equipment 10 supports this feature. This will require that the test system (e.g. TE or SS node) implements test procedures to ensure the UE signaling and performance related to this feature are verified i.e. receiving UE capability information, configuring UE to create frequency specific autonomous gaps for SI reading, receiving results on SI reading an analyzing/interpreting the results.

The user equipment 10 may signal or report the read SI to the radio base station 12' or another node serving the user equipment 10.

The method in the user equipment 10 may further comprise:

Signaling means to indicate to the network node, e.g. radio base station 12', that the user equipment 10 is capable of supporting autonomous gaps for a specific downlink carrier frequency for reading the SI of at least intra-frequency, inter-frequency and/or inter-RAT target cell.

Reporting the above capability to the network node proactively or based upon explicit request from the network node.

The method in the user equipment 10 may further comprise:

Receiving an indication from the network node 12,12',15 indicating the carrier(s) frequency(ies) and cells (if indicated) over which the user equipment 10 shall create the autonomous gaps for reading the SI of at least intra-frequency, inter-frequency or inter-RAT target cell Creating the autonomous gaps on the indicated carrier frequency and cell, if indicated, based on the received indication, reading the SI on the created autonomous gaps and reporting the results to the network node, e.g. eNB.

The method in the user equipment 10 may further comprise:

Creating the autonomous gaps carrier frequency based on one of the pre-determined or predefined rules or combination of received indication and pre-determined rules.

The method in the network node 12,12',15 may comprise signaling means to indicate the carrier(s) frequency(ies) and cells (if indicated) over which the user equipment 10 shall create the autonomous gaps for reading the SI of at least intra-frequency, inter-frequency or inter-RAT target cell Thus, in some examples, the user equipment 10 may report to a network node, such as a radio base station 12', the capability, or information about the capability, to create autonomous gaps in communication over a DL carrier, which autonomous gaps may be used for retrieving system information. The capability further indicates that the user equipment is capable of creating autonomous gaps on a frequency specific carrier. The user equipment 10 may then receive an indication from the network node 12,15 indicating downlink carrier or carrier frequency over which the user equipment 10 is to create autonomous gaps for reading system information of the cell 11. The user equipment 10 may then create the autonomous gaps and read the SI of the cell 11. The object may be achieved by a method in a network node. In some examples, the network node may receive the capability reported from the user equipment. Furthermore, the network node may then select or determines the carrier on which the user equipment is to create measurement gaps. According to some embodiments herein the network node requests the user equipment 10 to acquire system information relating to the cell 11. The network node transmits an indication to the user equipment 10, which indication specifies a downlink carrier to create autonomous gaps on for the user equipment 10 to acquire system information relating to the cell 11.

Some embodiments herein lead to the following benefits and advantages: provide flexibility to the network node, such as the first network node 12 or other network node, to specify the carrier frequency and/or frequency band over which the user equipment 10 creates the autonomous gaps for reading the SI of the cell; prevent the situation where the autonomous gaps are always created on the serving/primary carrier leading to data interruption/loss on the serving cell/primary cell; prevent the situation where the autonomous gaps are created on all the carriers, i.e. serving/primary carrier and secondary carriers, leading to data interruption/loss on all the serving cell/primary cell and secondary cells in carrier aggregation systems; enable network node 12,12', 15 to configure the user equipment 10 to create autonomous gaps on different carriers when reading more than one SI. This reduces the severe deterioration of the throughput and especially the peak data rate compared to the case when all set of autonomous gaps are created on the same carrier as in prior art; and avoid the user equipment 10 from configuring the autonomous gaps on certain carriers, which contain vital information e.g. control signaling, important/time critical data, positioning measurements or information related to emergency call etc.

Herein below a description of UE autonomous gaps for SI reading will be disclosed.

Mechanism of SI Reading

In HSPA and LTE the serving cell, e.g. the first 11, actually the radio base station 12', may request the user equipment 10 to acquire the system information of the target cell. More specifically the SI is read by the user equipment 10 to acquire the Cell Global Identifier (CGI), which uniquely identifies a cell, of the target cell.

The user equipment 10 reads the SI of the target cell, e.g. intra-, inter-frequency or inter-RAT cell, upon receiving an explicit request from the serving network node via RRC signaling e.g. from Radio Network Controller (RNC) in HSPA or eNodeB in case of LTE. The acquired SI may then be reported to the first cell 11, or the radio base station 12'. The signaling messages are defined in the relevant HSPA and LTE specifications.

In order to acquire the SI which contains the CGI of the target cell, the user equipment has to read at least part of the SI including Master Information Block (MIB) and the relevant System Information Block (SIB) as described later. The terms SI reading/decoding/acquisition, CGI/Evolved CGI (ECGI) reading/decoding/acquisition, Closed Subscriber Group (CSG) SI reading/decoding/acquisition are interchangeably used but have the same or similar meaning.

The reading of SI for the acquisition of CGI is carried out during measurement gaps which are autonomously created by the user equipment 10. The number of gaps and their size thus depends upon UE implementation as well as on other factors such as the radio conditions, type of SI to be read etc. The term autonomous means that the network does not know exactly when the gaps are created. The gaps are created at least in the downlink and in this case the user equipment 10 cannot receive data. But autonomous gaps may also be created in the uplink especially when acquiring the SI of the target inter-frequency cell or inter-RAT cell. In this case the user equipment 10 may neither receive nor transmit data. In contrast the normal periodical measurement gaps, a.k.a. compressed mode pattern, transmission gaps etc, are used for performing for instance mobility measurements such as RSRP/RSRQ. They are configured by the network by sending explicit configuration to the user equipment 10. Hence in this case the network precisely knows the location in time of each gap.

The autonomous gaps are needed because the user equipment 10 may not receive and/or transmit data in parallel with the reading of the SI of a target cell. The reason is that the simultaneous operation increases complexity, memory requirements and power consumption. Furthermore the legacy single carrier UE, i.e. non CA capable, typically has a single receiver for receiving data only on one carrier frequency e.g. one receiver comprising of 5 MHz in case of WCDMA or 20 MHz in case of LTE, i.e. one carrier in LTE may be up to 20 MHz. This means such a UE needs autonomous gaps for acquiring at least the inter-frequency and inter-RAT SI.

The SI reading may also be used for acquiring additional information beyond CGI e.g. CSG or hybrid CSG indicator etc.

In LTE the user equipment 10 reads the MIB and SIB1 of the target cell Evolved Universal Terrestrial Radio Access Network (E-UTRAN) cell, which may be Frequency Division Duplexing (FDD) or Time Division Duplexing (TDD) to acquire its CGI (a.k.a. E-UTRAN CGI) when the target cell is E-UTRAN intra- or inter-frequency.

In LTE the MIB is transmitted periodically with a periodicity of 40 ms and repetitions made within 40 ms. The first transmission of the MIB is scheduled in subframe #0 of radio frames for which the System Frame Number (SFN) mod 4=0, and repetitions are scheduled in subframe #0 of all other radio frames. In LTE the MIB contains basic information such as cell bandwidth, SFN etc.

The LTE SIB1, as well as other SIB messages, is transmitted on DL-Shared Channel (SCH). The SIB1 is transmitted with a periodicity of 80 ms and repetitions made within 80 ms. The first transmission of SystemInformationBlockType1 is scheduled in subframe #5 of radio frames for which the SFN mod 8=0, and repetitions are scheduled in subframe #5 of all other radio frames for which SFN mod 2=0. The LTE SIB1 may also indicate whether a change has occurred in the SI messages. The user equipment 10 is notified about coming change in the SI by a paging message, from which it will know that the system information will change at the next modification period boundary. The modification period boundaries are defined by SFN values for which SFN mod m=0, where m is the number of radio frames comprising the modification period. The modification period is configured by system information. The SIB1 contains information such as CGI, CSG identity, frequency band indicator etc.

In HSPA the user equipment 10 reads the MIB and SIB3 of the target cell UTRAN cell to acquire its CGI (aka Neighbor Cell SI) when the target cell is UTRAN intra- or inter-frequency. The MIB provides the basic information such as System Frame Number (SFN) and SIB3 contains the CGI of the target cell.

The procedure for inter-RAT SI acquisition during autonomous gaps is also specified for inter-RAT UTRAN, inter-RAT E-UTRAN, inter-RAT GEM/GSM EDGE Radio Access Network (GERAN), inter-RAT CDMA2000 etc. These are explained below:

In case of inter-RAT UTRAN, the user equipment 10 served by the E-UTRAN cell reads the MIB and SIB3 of the target UTRAN cell during autonomous gaps to acquire UTRAN cell system information e.g. UTRA cell CGI.

In case of inter-RAT E-UTRAN, the user equipment 10 served by the UTRAN cell reads the MIB and SIB1 of the target E-UTRAN cell, which may be FDD or TDD, during autonomous gaps to acquire E-UTRAN cell system information e.g. E-UTRA cell CGI.

In case of inter-RAT CDMA2000, the user equipment 10 served by the E-UTRAN cell reads the relevant broadcast information the target CDM2000 cell to acquire CDM2000 cell system information e.g. CDMA2000 cell CGI. CDMA2000 is a generic term. The target CDMA2000 cell may thus belong to CDMA2000 1× Radio Transmission technology (RTT) or High Rate Packet Data (HRPD) systems.

SI Reading Scenarios

The target cell whose SI may be acquired may be intra-frequency cell, inter-frequency cell or even inter-RAT cell, e.g. UTRAN, GERAN, CDMA2000 or HRPD. There are at least a few scenarios for which the serving cell may request the UE to report the CGI of the target cell. First, a verification of the CSG cell, then an establishment of Self Organizing Network (SON) Automatic Neighbor Cell Relation (ANR), and further a Minimization of Drive Test (MDT).

Verification of CSG Cell for CSG Inbound Mobility

In order to support mobility, the user equipment 10 may identify a number of neighbor cells and report their Physical Cell Identity (PCI) to the serving network node, e.g. serving eNode B in E-UTRAN). The user equipment 10 may also be requested to report the neighbor cell measurements such as RSRP and/or RSRQ in E-UTRAN or CPICH RSCP and/or CPICH Ec/No in UTRAN or even GERAN carrier RSSI or even pilot strength for CDMA2000/HRPD. In response to the reported UE measurement, the serving network node sends Handover (HO) command to the user equipment 10.

Due to smaller cell sizes in a dense deployment scenarios, e.g. femto cells, restricted small cells like femto closed subscriber group, pico cells etc, the PCIs are more frequently reused. In order to prevent HO command to a non-allowed home base station, e.g. CSG cell, the serving network node may also request the UE to decode and report the CGI of the target cell. This is also called as home inbound mobility. The CGI is unique in the network allowing the network to distinguish between macro BS and home BS or to uniquely identify that the reported cell belongs to CSG or hybrid CSG.

The procedure and the associated requirements for the target cell's CGI reporting are specified in E-UTRAN. One key aspect of the CGI decoding is that it is performed by the user equipment 10 during the autonomous gaps, which are created by the user equipment 10 itself. The reason of acquiring the target cell CGI during autonomous gaps stems from the fact that the typical UE implementation is not capable to simultaneously receive the data from the serving cell and acquire the target cell's system information, which contains the CGI. Furthermore the CGI acquisition of inter-frequency or inter-RAT target cell requires the user equipment 10 to even switch the carrier frequency. Hence the use of autonomous gaps is inevitable for acquiring the target cell's CGI. The autonomous gaps are created both in uplink and downlink.

Establishment of SON ANR

The SON function in E-UTRAN allows the operators to automatically plan and tune the network parameters and network nodes. The conventional method is based on manual tuning, which consumes enormous amount of time, resources and requires considerable involvement of work force. Due to network complexity, large number of system parameters, RAT technologies etc. it is very attractive to have reliable schemes to perform the test of self organization in the network whenever necessary.

An operator may also add or delete a cell or an entire base station, with multiple cells. Especially new cells are added more frequently during an early phase of network deployment. In the later stages an operator may still upgrade the network by adding more carriers or more base stations on the same carrier. The operator may also add cells related to another technology. This is called the ANR establishment and is part of the SON. In order to ensure correct establishment of the neighbor cell relation, the serving cell requests the user equipment 10 to report the CGI of the new target cell, whose PCI is identified and reported to the said serving cell. The CGI acquisition requires the user equipment 10 to read the target cell's system information and is thus carried out by the user equipment 10 during the autonomous gaps. As in case of home inbound mobility, the CGI acquisition for ANR purpose, also lead to interruption of the data from the serving cell.

Minimization of Drive Tests

The MDT feature has been introduced in LTE and HSPA Release 10. The MDT feature provides means for reducing the effort for operators when gathering information for the purpose of network planning and optimization. The MDT feature requires that the user equipment 10 logs or obtains various types of measurements, events and coverage related information. The logged or collected measurements or relevant information are then sent to the network. This is in contrast to the traditional approach where the operator has to collect similar information by means of the so called drive tests and manual logging. The MDT is described in TS 37.320 version 10.2.0. The user equipment 10 may collect the measurements during connected as well as in low activity states e.g. idle state in UTRA/E-UTRA, cell PCH states in UTRA etc.

The user equipment 10 may also be configured to report the CGI of the target cells along with other measurements, e.g. RSRP, RSRQ, CPICH measurements, radio link failure report, Broadcast Channel (BCH) failure rate, paging channel failure rate etc. In connected mode the existing procedures are used to acquire the CGI of the target cells for the purpose of the MDT. In idle mode the user equipment 10 may be configured to log the cell measurements along with the CGI and report the logged measurements to the network at suitable occasion, e.g. when the user equipment 10 goes to connected mode. One key aspect that distinguishes the normal CGI reporting is that in case of MDT, the acquired CGI of the target cells are acquired by the MDT functionality e.g. MDT node which may be a logical or physical node. The MDT node may use the acquired CGI for network planning and optimizing of the network.

The CGI for MDT purpose is also acquired during the autonomous gaps as in case of CSG inbound mobility or SON ANR.

SI Reading Requirements

The SI reading requirements in E-UTRAN are specified or being specified for the following scenarios: Intra-frequency ECGI reporting; Inter-frequency ECGI reporting; and/or Inter-RAT UTRAN CGI reporting.

The user equipment 10 is required to report the E-UTRA intra-frequency ECGI within about 150 ms from a target intra-frequency cell provided its SINR is at least −6 dB or higher. During the acquisition of the target cell's ECGI on the serving carrier frequency the UE is allowed to create autonomous gaps in the downlink and uplink for reading target cell's SI. Under continuous allocation the user equipment 10 is required to transmit certain number of ACK/NACK on the uplink to ensure that the user equipment 10 does not create excessive gaps.

The user equipment 10 is required to report the E-UTRA inter-frequency ECGI also within about 150 ms from a target inter-frequency cell provided its Signal to Interference plus Noise Ratio (SINR) is at least −4 dB or higher. During the acquisition of the target cell's ECGI on the serving carrier frequency the user equipment 10 is allowed to create autonomous gaps in the downlink and uplink for reading target cell's SI. This causes the user equipment 10 to interrupt downlink reception and uplink transmission in the serving cell. Under continuous allocation the user equipment 10 is also required to transmit certain number of ACK/NACK on the uplink to ensure that the user equipment 10 does not create excessive gaps.

In UTRAN, the target UTRA cell's CGI acquisition is much longer e.g. more than 1 second depending upon the periodicity of the SIB3, which contains the CGI. Furthermore due to the autonomous gaps created by the user equipment 10 to acquire the target cell's CGI, the aggregate interruption of the data transmission and reception from the serving cell may be 600 ms or longer.

In case of inter-RAT UTRAN, the target UTRA cell's CGI acquisition may take up to 2 seconds. The aggregate interruption of the data transmission and reception from the serving cell may be up to 1 second or longer.

Positioning

Several positioning methods for determining the location of a target device, which may be the user equipment 10, mobile relay, PDA etc exist. The methods are: Satellite based methods, these methods use Assisted Global Navigation Satellite System (A-GNSS), e.g. Assisted Global Positioning System (A-GPS), measurements for determining UE position; Observed Time Difference of Arrival (OTDOA), these use UE Reference Signal Time Difference (RSTD) measurement for determining UE position in e.g. LTE; Uplink Time Difference of Arrival (UTDOA), which uses measurements done at a Location Measurement Unit (LMU) for determining UE position; Enhanced cell ID (E-CID), which uses one or more of UE Rx-Tx time difference, BS Rx-Tx time difference, LTE P/RSRQ, HSPA CPICH measurements, Angle of Arrival (AoA) etc for determining UE position; and Hybrid methods that use measurements from more than one method for determining UE position.

In LTE the positioning node, a.k.a. E-SMLC or location server, configures the user equipment 10, eNode B or LMU to perform one or more positioning measurements. The positioning measurements are used by the user equipment 10 or positioning node to determine the UE location. The positioning node communicates with the user equipment 10 and radio base station 12' in LTE using e.g. LPP and LTE Positioning Protocol annex (LPPa) protocols.

Embodiments herein enable the network node 12,12',15 to select and indicate the downlink carrier or carrier(s) frequency(ies) to the user equipment 10 on which the user equipment 10 creates autonomous gaps for performing measurements enabling the user equipment 10 to acquire the system information (SI) of a target cell. The SI information comprises at least the cell global identifier, CGI aka ECGI, of intra-frequency, inter-frequency or inter-RAT cell.

Conclusively, according to disclosed embodiments the user equipment 10 may signal its information of its capability a.k.a. carrier frequency specific autonomous measurement gap capability to the network node 12. The network node may in its turn select the downlink carrier on which the user equipment 10 may create autonomous gaps. The selection of carrier or band on which the user equipment 10 creates gaps may be determined by the network node 12,12',15 or by the pre-determined rule or combination thereof. For example, consider that the user equipment 10 supports inter-band CA for band A and band B. PCell is configured on band A and SCell on band B by the serving network node 12. The network node 12,12',15 requests the user equipment 10 to read the SI of certain cell whose PCI is provided to the user equipment 10. In prior art a UE will always create the autonomous gaps for reading the SI of the target cell on a carrier on band A i.e. data interruption occurs always on PCell. In some prior art implementation, a UE may even create autonomous gaps on the band B causing data interruption even on SCell. However according to the disclosed method herein the user equipment 10 may create autonomous gap either on band A or band B. For example the network node 12,12',15 may request the user equipment with such capability to create autonomous gaps on the band B when reading the SI. This will cause data interruption only on SCell. Thus, the user equipment 10 may receive the indication and based on the received indication create the autonomous gaps over the indicated downlink carrier or carrier frequency. It should be noted that the user equipment 10 may have configured pre-determined rules indicating the downlink carrier over which the user equipment 10 creates autonomous gaps. The user equipment 10 may determine downlink carrier for creating the autonomous gaps using a combination of network configuration and pre-determined rules. In some embodiments the network node 12,12',15 forwards the received capability information and/or selected carrier/band information to other network nodes. Embodiments herein also relate to network nodes using the received information for different tasks.

Pre-Determined Rules for Selecting Carrier to Create Autonomous Gaps

According to an aspect of some embodiments herein the downlink carrier on which the autonomous gaps are to be created by the user equipment 10 for SI reading is determined from the pre-determined rules e.g. specified in the standard. This means the network node 12,12',15 does not have to signal this information, i.e. specify the downlink carrier or any indication on which the autonomous gaps are created, to the user equipment 10. Yet another possibility is that in case the downlink carrier information is not explicit signaled then the user equipment 10 may use one or more pre-determined rules otherwise the user equipment 10 may use the signaled downlink carrier for creating the autonomous gaps on the indicated carrier.

Furthermore when the user equipment 10 decides the downlink carrier and e.g. cell on which the autonomous gaps are created the user equipment 10 may also indicate this information to the network node 12,12',15 or another network node, e.g. BS, RNC/Node B or eNB in LTE, relay, donor node etc. The information may be sent by the user equipment 10 prior to start reading SI or along with the acquired SI, i.e. with measurement results/reports.

Alternatively the network node 12,12',15 may also autonomously detect over which downlink carrier the autonomous gaps are created by the user equipment 10 when user equipment 10 may choose or select the downlink carrier itself. For example the network node 12,12',15 may determine this if there is no feedback response from the user equipment 10 within a time period (T1-T2) on the PCell e.g. no Hybrid Automatic Repeat Request (HARQ) feedback containing Acknowledgements (ACK) or Non-Acknowledgements (NACK) or Channel Quality Indicator (CQI) response within T1 and T2 respectively.

Determination Based on Combination of Network Configuration and Pre-Determined Rules According to some embodiments the downlink carrier on which the autonomous gaps are created is determined based on the combination of the network configuration, i.e. explicit signaling as described above, and the pre-determined rules. For example any of the network configuration principles described above may be used to indicate the possible candidate downlink carriers on which the user equipment 10 may create the autonomous gaps for reading the SI. The pre-configuration information may be sent to the user equipment 10 by the network node 12,12',15 prior to requesting the SI reading or along with the request for SI reading. For instance the network node 12,12',15 may pre-configure the user equipment 10 that the user equipment 10 may create the autonomous gaps on more than one carrier e.g. F1 and F3 when it reads the SI. This may also be linked to a specific type of SI reading e.g. for intra-frequency cell. In addition to the pre-configuration the user equipment 10 may use any of the pre-determined rules described below when actually creating the autonomous gaps on the suitable downlink carrier e.g. user equipment 10 may choose F2 to create the autonomous gaps for reading SI of certain cell when requested by the network node 12.

Furthermore the user equipment 10 may also explicitly as a second indication or a selection indication, signal the information about the downlink carrier and e.g. also cell, e.g. cell ID, CGI etc, on which it has created the autonomous gaps, e.g. the user equipment 10 indicates to the RNC/Node B in HSPA or eNB in LTE that it has or it will create the autonomous gaps on certain cell on the F2 for reading SI of the requested cell. Alternatively the network node 12,12',15 may also autonomously detect the downlink carrier over which the user equipment 10 has created the autonomous gaps by using similar principles described above.

Signaling Information to Other Network Nodes

It should also be understood that in some embodiments the network node 12,12',15, e.g. serving radio network node 12', has information about the downlink carriers on which the user equipment 10 creates autonomous gaps for reading different types of SI. The network node 12,12',15 may also have the information related to the cell, e.g. PCI, CGI etc, on the indicated downlink carrier on which the autonomous gaps are to be created by the user equipment 10. It also has the user equipment 10 capability information. According to some embodiments the network node 12,12',15 may signal the above mentioned information related to the downlink carrier and cell on which the measurement gaps are created by the user equipment 10 for reading the SI to other network nodes. The network node 12,12',15 may also signal the information related to the acquired SI and the associated downlink carrier and the cell on which the autonomous gaps are created. The network node 12,12',15 may also additionally signal the acquired information about the capability of the user equipment 10 (described above) to other network nodes.

The other network nodes such as the second network node 15 or similar may be a neighboring radio network node, e.g. controlling RNC, neighboring RNC, Node B, eNode B, BS, relay, donor node etc.; any configuring node e.g. positioning node such as E-SMLC configuring positioning measurements etc; a core network node e.g. MME, access gateway etc. and/or any centralized network node e.g. MDT node, SON node, network monitoring and planning node, O&M node, Operation Support Subsystem (OSS) node etc.

For example in LTE, the network node 12,12',15 being an eNode B may signal this information to other eNode B over the X2 interface. Similarly the eNode B may signal this information to the positioning node e.g. E-SMLC in LTE over the LPPa protocol. Another example is that of a relay node may signal this information to another relay node, e.g. in multi-hop relay system but also applies to single hop relay system, or to a donor BS e.g. LTE relay node signaling this information to its donor eNode B. Similarly the eNode B in LTE may signal the above mentioned information to the MME over S1. In HSPA, when the network node 12,12',15 is an RNC, the RNC may signal this information to another RNC over Iur interface. The RNC may even signal this information to Node B over Iub interface.

Method in Other Network Nodes of Using The Received Information for Different Tasks The other network nodes, such as the O&M node, MME, positioning node, second radio base station, may use the acquired information, i.e. the information about capability, and indicated downlink carrier for autonomous gaps, and e.g. cell which gaps are created, acquired SI and etc, for one or more of the following tasks:

When the second network node 15 is a radio network node such as a second radio base station, the radio network node may use the acquired information for configuring the appropriate downlink carrier for requesting user equipment 10 to perform SI reading after the handover or cell change. The radio network node may also select appropriate physical layer parameters and configuration, e.g. modulation and coding scheme, HARQ parameters etc, depending upon whether autonomous gaps are created or not on certain downlink carrier. For example, if autonomous gaps are created more often, then the radio network node may use less robust schemes, e.g. less robust coding scheme. Otherwise, the radio network node may use more robust parameters to enable better physical layer performance, i.e. robust recovery from errors;

When the second network node 15 comprises a positioning node, the positioning node may use the acquired information to avoid critical positioning measurements, e.g. or emergency calls, on carriers where the user equipment 10 often creates autonomous gaps. The positioning node may also use the acquired information for selecting configuration parameters related to positioning session/measurements, e.g. assistance data sent to user equipment 10 to assist the positioning measurements;

The second network node 15 may monitor a network performance. A centralized or any radio network node may use the acquired information, e.g. statistics, for monitoring the network performance network and observation; and the second network node 15 may perform network planning and deployment. The centralized or any radio network node may use the obtained information for planning, dimensioning, deployment of network nodes, identification of location to deploy or modify different features such as carrier aggregation, configuration and setting of network parameters such as carrier frequencies, bands, bandwidth selection etc.

The examples of criteria in addition to the capability of the user equipment 10 to determine the most suitable downlink carrier on which autonomous gaps are created are listed below and in reference to FIG. 3. FIG. 3 discloses frequencies of frequency bands, Band A and Band B, of a user equipment. Band A comprises frequencies F1 and F2 and band B comprises frequencies F3. Frequencies are defined along axis [f].

A first criterion may be 'Least number of carriers in one band' The network node 12,12',15 chooses the downlink carrier which is adjacent to the least number of DL carriers. For example, in FIG. 3, F3 on band B may be chosen for activating the autonomous gaps. The reason is that if F1 is chosen then there will be data interruption on all adjacent carriers in band A, i.e. on F1 and F2, during the occurrence of the measurement gaps.

In addition or alternative another criterion may be 'Least data interruption/loss' The network node 12,12',15 may choose the downlink carrier for activating the autonomous gaps where the data loss or interruption is likely to be the least. For example the downlink carrier over which the transmission is sporadic or the traffic is low may be selected by the network for the creation of the autonomous gaps. The network node 12,12',15 when selecting the downlink carrier may also consider the uplink traffic in case there is also uplink multi-carrier transmission. This is because the autonomous gaps lead to the interruption/loss of data on the UL carrier which is associated with the DL carrier on which the autonomous gaps are activated i.e. autonomous gaps are created on both DL carrier and the associated UL carrier.

In addition or alternative another criterion may be 'Type of service/time criticality'. The network node 12,12',15 may choose the downlink carrier for the creation of autonomous gaps over which the data is less time critical. For example if data transmission on F1 comprises of mainly real time service and on F2 comprises of mainly non real time service then the network node 12,12',15 may select F2 for the creation of autonomous gaps. This is because the transmission delay may become longer due to the autonomous gaps.

In addition or alternative another criterion may be 'Distribute autonomous gaps over carriers'. According to this criterion the network node 12,12',15 may select different downlink carriers for creating autonomous gaps for SI reading on different cells. This is particularly useful in case SI reading from more than one cell is required at the same time. The network node 12,12',15 may also select different carriers for different types of SI reading. For example network node 12,12',15 may select either PCC or SCC for SI reading on intra-frequency cell but selects the secondary carrier for inter-frequency or inter-RAT SI reading. The reason is that the intra-frequency SI reading causes less data interruption due to shorter or fewer required gaps. For example in FIG. 3, assume LTE multi-carrier system, the network node 12,12',15 selects F1 for user equipment 10 to create autonomous gaps for acquiring the SI of LTE intra-frequency cell and selects F3 for user equipment 10 to create autonomous gaps for acquiring the SI of inter-RAT UTRAN cell. In prior art a user equipment will always create gaps on at least F1 or even on all F1, F2 and F3. This may lead to more loss of data on F1 compared to the disclosed method which allows distribution of the autonomous gaps across downlink carriers.

In addition or alternative another criterion may be 'Autonomous gap length or density'. Another criterion to determine the carrier is based on the length and/or density of the autonomous gaps. For example, if the autonomous gaps are denser, e.g. closely placed and/or each gap is larger than a threshold, and/or the overall duration of a gap is longer than a threshold, then the network node 12,12',15 may decide to select the non-serving carrier or a secondary carrier in the second or subsequent frequency bands. This is to minimize loss of data or peak throughput on the primary carrier or serving carrier.

FIG. 4 discloses frequencies of frequency bands, Band A and Band B, of a user equipment. Band A comprises frequencies F1, F2 and F3 and band B comprises frequencies F4 and F5. Frequencies are defined along axis [f]. FIG. 5 discloses frequencies of frequency bands, Band A, Band B and Band C, of a user equipment. Band A comprises frequencies F1, F2 and F3, band B comprises frequencies F4 and F5, and Band C comprises frequencies F6. Frequencies are defined along axis [f].

In reference to FIG. 4 and FIG. 5 examples of some pre-determined rules will be explained. As stated above the user equipment 10 may comprises a pre-determined rule specifying which downlink carrier to create autonomous gaps on. The pre-determined rule may e.g. be stating: —On primary carrier: The autonomous gaps are created on the primary carrier if the number of carriers is the same in all bands. Another possibility is that autonomous gaps are created on the primary carrier if all the downlink carriers are in the same band or if all of them are adjacent; —On most isolated carrier: According to this pre-determined rule the user equipment 10 activates the autonomous gaps on the downlink carrier which is not adjacent to other downlink carriers or which has least number of adjacent carriers. For example in FIG. 4 and FIG. 5, the user equipment 10 creates the autonomous gaps on band B in FIG. 4 and band C in FIG. 5.—Separate carriers for creating multiple autonomous gaps: In case more than one set of autonomous gap is used, e.g. one set for reading SI on intra-frequency cell and another set for reading SI on inter-frequency cell, then an alternating rule may be used. For example each set of autonomous gap may be created on different downlink carriers. For example in FIG. 4, the user equipment 10 capable of CA may create one set of autonomous gap on band A and another set on band B for acquiring SI of intra-frequency cell and inter-RAT cell respectively; based on Autonomous gap length and/or density, according to this pre-determined rule the denser autonomous gaps, i.e. more frequency and/or with larger gaps, are configured on secondary downlink carrier and preferably on a band which does not contain the primary carrier. Any combinations of the above pre-determined rules may also be used.

Figure 6:
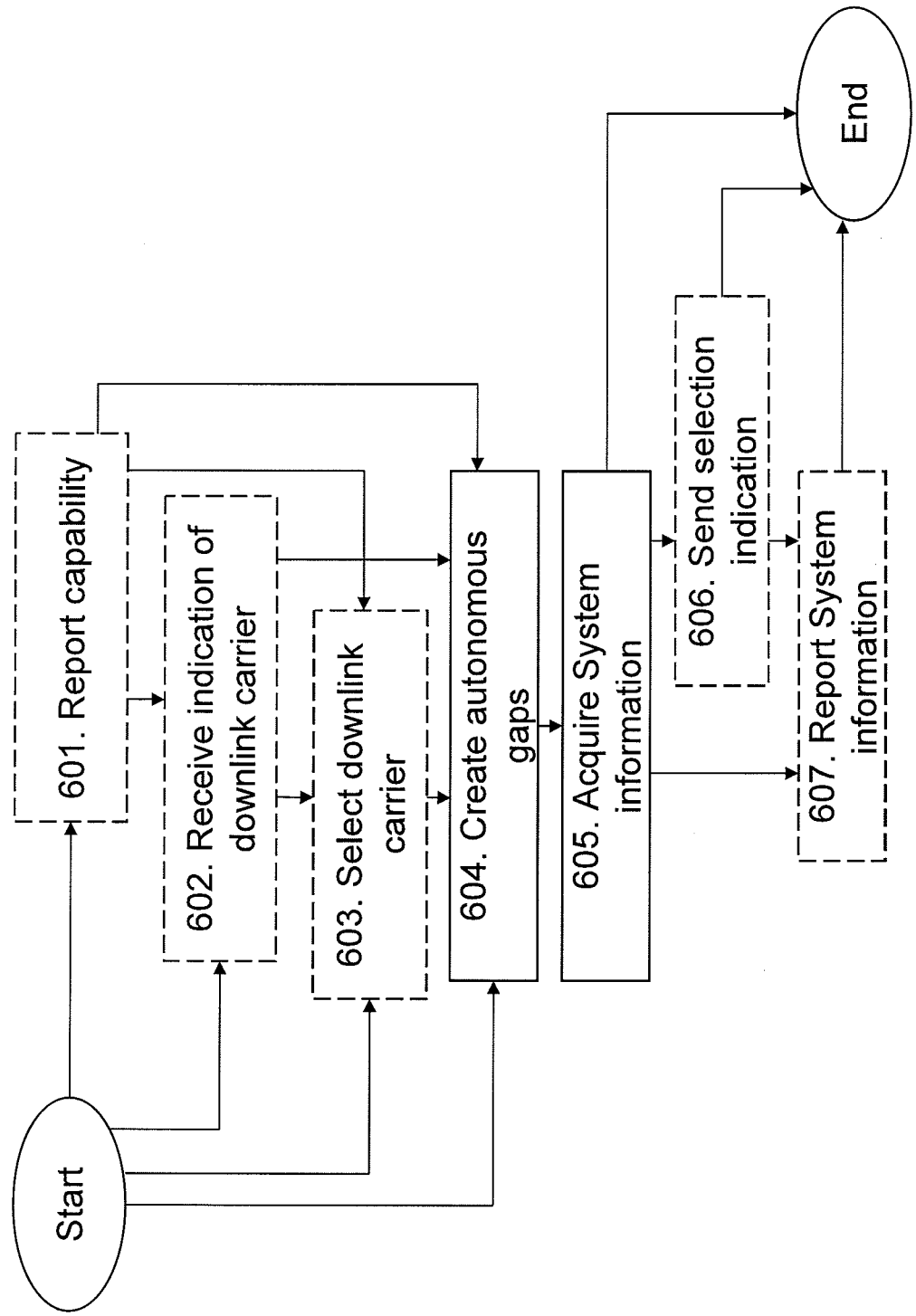
FIG. 6 is a schematic flowchart depicting methods in a user equipment according to embodiments herein.

The method actions in the user equipment 10 for acquiring system information relating to a cell, e.g. first cell 11 or second cell 14, in a radio communications network according to some general embodiments will now be described with reference to a flowchart depicted in FIG. 6. The actions do not have to be taken in the order stated below, but may be taken in any suitable order. Actions performed in some embodiments are marked with dashed boxes. The cell 11,14 is served by the network node 12,12',15. The user equipment 10 is capable of receiving signals on more than one downlink carrier simultaneously.

Action 601. The user equipment 10 may report, to the network node 12,12',15, a capability to create autonomous gaps on any of the downlink carrier out of the more than one downlink carrier for acquiring system information of a cell.

Action 602. The user equipment 10 may receive the indication from the network node 12,12',15 and/or an identity of the cell 11,14. The indication specifies the downlink carrier to use for creating autonomous gaps on.

Action 603. In some embodiments the user equipment 10 selects the downlink carrier to create autonomous gaps for acquiring the system information of the cell 11,14 based on the received indication and/or the pre-determined rule.

Action 604. The user equipment 10 creates autonomous gaps on the downlink carrier. The downlink carrier to use for creating autonomous gaps on is based on the received indication from the network node 12,12',15 and/or a pre-determined rule. The indication or pre-determined rule specifies the downlink carrier. The indication or the pre-determined rule may further define that the downlink carrier is not associated to a Primary Cell or a serving cell. According to some embodiments, the pre-determined rule may define that the downlink carrier to be at least one of: a primary carrier; a secondary carrier; an isolated carrier; a carrier based on system information type; a carrier based on gap length and/or density of the autonomous gaps. The indication may indicate different specific downlink carriers for creating autonomous gaps for acquiring different types of system information.

Action 605. The user equipment 10 acquires the system information of the cell 11,14 on the downlink carrier using the created autonomous gaps.

Action 606. The user equipment 10 may send to the network node 12,12',15, a selection indication or a second indication indicating the selected downlink carrier.

Action 607. The user equipment 10 may report the acquired system information to the network node 12,12',15. The system information of the cell 11,14 may comprise one or more of: a cell global identity, CGI; a closed subscriber group, CSG, indicator; a hybrid CSG indicator; Master Information Block, MIB, and one or more System Information Blocks, SIB.

FIG. 7 is a block diagram depicting the user equipment 10 for acquiring system information relating to the cell, such as the first cell 11 or the second cell 14, in the radio communications network. The cell is served by the network node 12,12',15 and the user equipment 10 is configured to receive signals on more than one downlink carrier simultaneously.

The user equipment 10 comprises a creating circuit 701 configured to create autonomous gaps on the downlink carrier. The downlink carrier to use for creating autonomous gaps on is based on the received indication from the network node 12,12',15 and/or a pre-determined rule. The indication or pre-determined rule specifies the downlink carrier. The indication or the pre-determined rule may define that the downlink carrier is not associated to a Primary Cell or a serving cell. The pre-determined rule may define the downlink carrier to be at least one of: a primary carrier; a secondary carrier; an isolated carrier; a carrier based on system information type; a carrier based on gap length and/or density of the autonomous gaps. In some embodiments the indication indicates different specific downlink carriers for creating autonomous gaps for acquiring different types of system information.

The user equipment 10 further comprises an acquiring circuit 702 configured to acquire the system information of the cell on the downlink carrier using the created autonomous gaps.

The user equipment 10 may further comprise a selecting circuit 703 configured to select the downlink carrier to create autonomous gaps for acquiring the system information of the cell based on the received indication and/or the pre-determined rule.

The user equipment 10 may further comprise a transmitter 704 configured to send, to the network node 12,12',15, a selection indication, also referred to as a second indication, indicating the selected downlink carrier.

The user equipment 10 may further comprise a receiver 705 configured to receive the indication from the network node 12,12',15 and/or the identity of the cell.

The user equipment 10 may further comprise a reporting circuit 706 configured to report to the network node 12,12', 15, the capability to create autonomous gaps on any of the downlink carrier out of the more than one downlink carrier for acquiring system information of a cell. The reporting circuit 706 may further be configured to report the acquired system information to the network node 12,12',15. The system information of the cell may e.g. comprise one or more of: a cell global identity, CGI; a closed subscriber group, CSG, indicator; a hybrid CSG indicator; Master Information Block, MIB, and one or more System Information Blocks, SIB.

The user equipment 10 may comprise a processing circuit 707 to perform the embodiments herein. The processing circuit 707 may comprise a signaling circuit or the reporting circuit 706 configured to signal measurement gap capability. The processing circuit 707 may comprise the receiver 705 configured to receive the indication of the determined/selected carrier frequency or a frequency band from the network node 12. The processing circuit 707 may further comprise a performing circuit or the creating circuit 701 configured to create a gap in the determined carrier or frequency band, and to retrieve SI during this gap. Thus, the user equipment 10 may interrupt a carrier and measures signals on a broadcast channel. The processing circuit 707 in the user equipment 10 depicted in FIG. 7, together with computer program code is configured to perform the functions and/or method actions of the embodiments herein. The program code mentioned above may also be provided as a computer program product, for instance in the form of a data carrier carrying computer program code for performing embodiments herein when being loaded into the user equipment 10. One such carrier may be in the form of a CD ROM disc. It is however feasible with other data carriers such as a memory stick. The computer program code may furthermore be provided as pure program code on a server and downloaded to the user equipment 10.

The user equipment 10 may comprise a memory 708. The memory 708 may comprise one or more memory units and may be used to store for example data such as capability, SI, rules, application to perform the methods herein when being executed on the user equipment 10 or similar.

Figure 8:
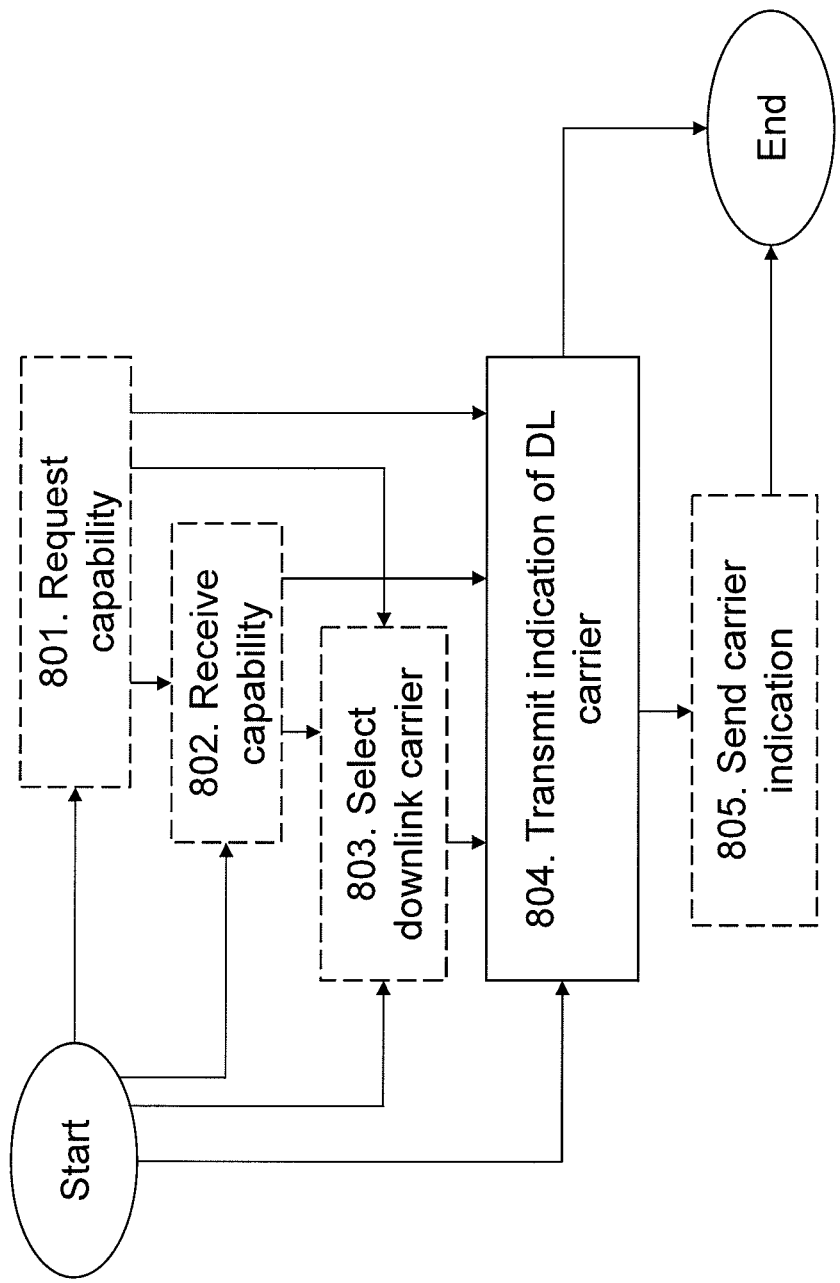
FIG. 8 is a schematic flowchart depicting methods in a network node according to embodiments herein.

The method actions in the network node, referred to as a first network node 12, e.g. the radio base station 12', or a second network node 15 in the figures, for requesting the user equipment 10 to acquire system information relating to the cell 11,14 in the radio communications network according to some general embodiments will now be described with reference to a flowchart depicted in FIG. 8. The actions do not have to be taken in the order stated below, but may be taken in any suitable order. The cell 11,14 is served by the network node. The user equipment 10 is capable of receiving signals from more than one downlink carrier simultaneously. Actions performed in some embodiments are depicting with dashed boxes.

Action 801. The network node 12,12',15 may request the user equipment 10 to report the capability of the user equipment 10 to create autonomous gaps on any of the downlink carrier out of the more than one downlink carrier for acquiring system information of a cell.

Action 802. In some embodiments, the network node 12,12',15 receives, from the user equipment 10, a capability indication indicating capability of the user equipment 10 to create autonomous gaps on any of the downlink carriers out of the more than one downlink carrier for acquiring system information of the cell.

Action 803. The network node 12,12',15 may select the downlink carrier on which the user equipment 10 is to create autonomous gaps on for acquiring the system information. The network node may select downlink carrier based on the received capability indication, or on the received capability indication and an additional criterion. The additional criterion may comprise at least one of: a downlink carrier that is adjacent to the least number of carriers; a downlink carrier that results in least data loss due to autonomous gaps; a downlink carrier that comprises least time critical; a downlink carrier that is based on gaps lengths and/or gap density of the autonomous gaps; and whether autonomous gaps are distributed over more than one carrier for acquiring system information of more than one cell. The network node may select the downlink carrier based on a combination of the received indication and a pre-determined rule.

Action 804. The network node 12,12',15 transmits the indication to the user equipment 10. The indication specifies the downlink carrier to create autonomous gaps for the user equipment 10 to acquire the system information relating to the cell 11, 14, thereby requesting the user equipment 10 to acquire system information relating to the cell 11,14. In some embodiments the network node 12,12',15 selects different carriers for retrieving different types of system information and the network node 12,12',15 transmits indications of the selected different carriers. E.g. the network node may transmit a command to the user equipment 10 to create measurement gap for reading system information of the cell.

Action 805. The network node 12,12',15 may send, to the second network node 15, a carrier indication, also referred to as a third indication, indicating the downlink carrier for the user equipment 10 to create autonomous gaps on. The network node may further send a capability indication indicating capability of the user equipment 10 to create autonomous gaps on any of the downlink carrier out of the more than one downlink carrier for acquiring system information of a cell.

It should be noted that the method of receiving the capability information may also be implemented in a test system which comprises of at least test equipment (TE) node (aka system simulator (SS). The test system may use this for testing purposes for verifying that user equipment 10 supports this feature/capability of frequency specific autonomous gaps for SI reading. For example the test may be a signaling/protocol/procedure test case or a performance/RRM test case to verify the UE capability.

FIG. 9 is a block diagram depicting the network node 12, such as the radio base station 12', core network node, positioning node, controller node or similar, for requesting the user equipment 10 to acquire system information relating to the cell, such as the first and/or the second cell 11,14, in the radio communications network. The network node 12,12',15 is configured to serve the cell and the user equipment 10 is capable of receiving signals from more than one downlink carrier simultaneously.

The network node 12,12',15 comprises a transmitter 901 configured to transmit the indication to the user equipment 10. The indication specifies the downlink carrier to create autonomous gaps for the user equipment 10 to acquire system information relating to the cell. Thereby the network node 12,12',15 requests the user equipment 10 to acquire system information relating to the cell.

The network node 12,12',15 may further comprise a selecting circuit 902 configured to select the downlink carrier on which the user equipment 10 is to create autonomous gaps on for acquiring the system information. In some embodiments the selecting circuit 902 is configured to select different carriers for retrieving different types of system information and the transmitter 901 is configured to transmit indications of the selected different carriers.

The network node 12,12',15 may further comprise a receiver 903 configured to receive, from the user equipment 10, the capability indication indicating capability of the user equipment 10 to create autonomous gaps on any of the downlink carriers out of the more than one downlink carrier for acquiring system information of a cell. In some embodiments the selecting circuit 902 may be configured to select downlink carrier based on the received capability indication, or on the received capability indication and an additional criterion. The additional criterion may e.g. comprise at least one of: a downlink carrier that is adjacent to the least number of carriers; a downlink carrier that results in least data loss due to autonomous gaps; a downlink carrier that comprises least time critical; a downlink carrier that is based on gaps lengths and/or gap density of the autonomous gaps; and whether autonomous gaps are distributed over more than one carrier for acquiring system information of more than one cell.

The network node 12,12',15 may further comprise a requesting circuit 904 configured to request the user equipment 10 to report the capability of the user equipment 10 to create autonomous gaps on any of the downlink carrier out of the more than one downlink carrier for acquiring system information of a cell.

The network node 12,12',15 may further comprise a sending circuit 905 configured to send, to the second network node, such as the O&M node, a carrier indication indicating the downlink carrier for the user equipment 10 to create autonomous gaps on. The sending circuit 905 may further, additionally or alternatively, be configured to send a capability indication indicating capability of the user equipment 10 to create autonomous gaps on any of the downlink carrier out of the more than one downlink carrier for acquiring system information of a cell.

The network node 12,12',15 may comprise a processing circuit 906 configured to perform embodiments herein. The processing circuit 906 may e.g. comprise a receiving circuit or the receiver 903 configured to receive measurement gap capability from the user equipment 10 or another network node. The measurement gap capability may be stored on a memory 907 comprised in the network node. The processing circuit 906 may comprise the selecting circuit 902 configured to select a carrier frequency or frequency band on which autonomous gaps are to be created. The selection may be based on pre-determined rules or similar. The processing circuit 906 may further comprise the sending circuit 905 and/or transmitter 901 configured to transmit the indication of the downlink carrier, carrier frequency or frequency band, thus indicating which downlink the user equipment 10 should perform autonomous gaps on. Furthermore, the processing circuit 906 may be configured to process received SI from the user equipment 10. The processing circuit 906 may further comprise the requesting circuit 904.

The processing circuit 906 in the network node 12,12',15 depicted in FIG. 9, together with computer program code is configured to perform the functions and/or method actions of the embodiments herein. The program code mentioned above may also be provided as a computer program product, for instance in the form of a data carrier carrying computer program code for performing embodiments herein when being loaded into the network node 12. One such carrier may be in the form of a CD ROM disc. It is however feasible with other data carriers such as a memory stick. The computer program code may furthermore be provided as pure program code on a server and downloaded to the network node 12.

The memory 907 may comprise one or more memory units and may be used to store for example data such as capability, SI, rules, application to perform the methods herein when being executed on the network node 12,12',15 or similar.

Figure 10:
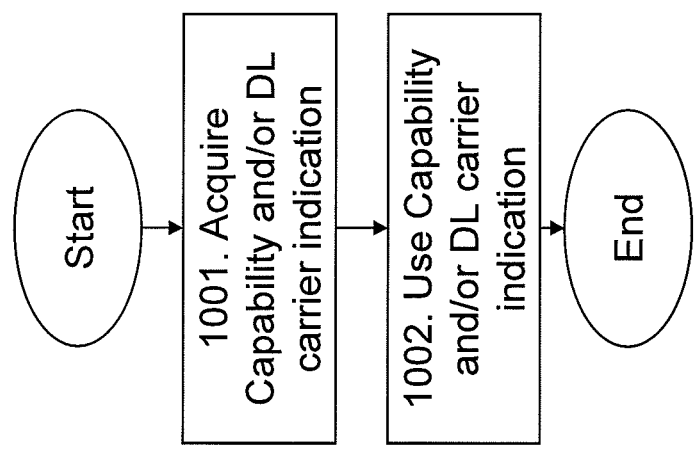
FIG. 10 is a schematic flowchart depicting methods in a second network node according to embodiments herein.

The method actions in the second network node, such as a second radio base station, positioning node, MME, O&M, or similar, for handling autonomous gap information, such as the selection indication or the capability indication, from the user equipment 10 or a first network node according to some general embodiments will now be described with reference to a flowchart depicted in FIG. 10. The autonomous gaps are created by the user equipment 10 for acquiring system information relating to the cell 11,14 in the radio communications network. The cell 11,14 is served by the first network node 12, and the user equipment 10 is capable of receiving signals from more than one downlink carrier simultaneously.

Action 1001. The second network node 15 acquires, from the user equipment 10 or the first network node 12, information of a capability of the user equipment 10 to create autonomous gaps on a downlink carrier, e.g. the capability indication. The autonomous gaps are for acquiring system information. Additionally or alternatively, the second network node 15 further acquires information specifying a downlink carrier on which the user equipment 10 is to create autonomous gaps for acquiring system information of a cell, e.g. the selection indication.

Action 1002. The second network node 15 uses the information of the capability and/or the downlink carrier to configure a downlink carrier for one or more of: requesting the user equipment 10 to acquire system information after the handover or cell change; configuring one or more physical layer parameter depending upon whether autonomous gaps are created or not on a certain downlink carrier for acquiring system information; selecting configuration parameters related to positioning measurements on a carrier depending upon whether autonomous gaps are created or not on the carrier; network performance monitoring; network planning or deployment; and a radio management task.

The radio management task may comprise selecting one or more of physical layer parameters and configuration depending upon the downlink carrier on which the autonomous gaps are more often created by the user equipment 10.

Figure 11:
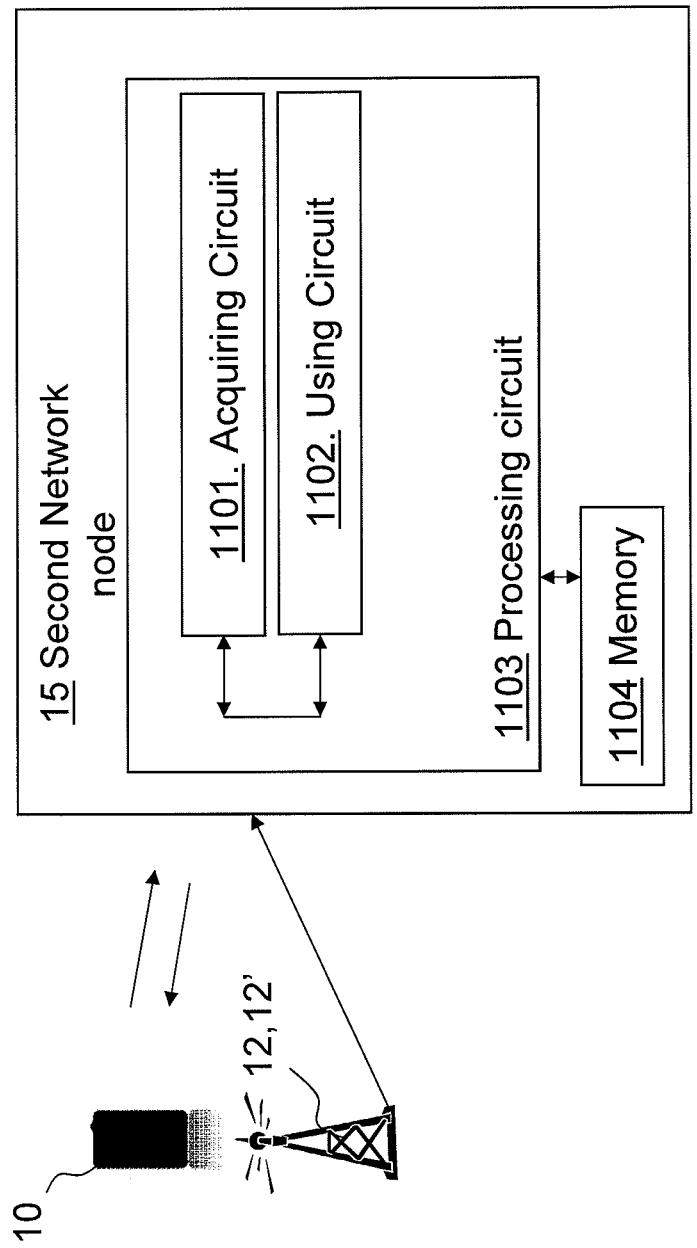
FIG. 11 is a block diagram depicting the second network node according to some embodiments herein.

FIG. 11 is a block diagram depicting the second network node 15, such as the O&M node or the second radio base station, according to some embodiments herein for handling autonomous gap information from the user equipment 10 or the first network node 12. As stated above, the autonomous gaps are created by the user equipment 10 for acquiring system information relating to the cell in the radio communications network. The cell is served by the first network node 12 and the user equipment 10 is capable of receiving signals from more than one downlink carrier simultaneously.

The second network node 15 comprises an acquiring circuit 1101 configured to acquire, from the user equipment 10 or the first network node 12, information of the capability, of the user equipment 10, to create autonomous gaps on a downlink carrier. The autonomous gaps are for acquiring system information. The acquiring circuit 1101 is further, additionally or alternatively, configured to acquire information specifying the downlink carrier on which the user equipment 10 is to create autonomous gaps for acquiring system information of a cell.

The second network node 15 comprises a using circuit 1102 configured to use the information of the capability and/or the downlink carrier to configure a downlink carrier for one or more of: requesting the user equipment 10 to acquire system information after the handover or cell change; configuring one or more physical layer parameter depending upon whether autonomous gaps are created or not on a certain downlink carrier for acquiring system information; selecting configuration parameters related to positioning measurements on a carrier depending upon whether autonomous gaps are created or not on the carrier; network performance monitoring; network planning or deployment; and a radio management task.

As stated above, the radio management task may comprise selecting one or more of physical layer parameters and configuration depending upon the downlink carrier on which the autonomous gaps are more often created by the user equipment 10.

The embodiments herein for handling autonomous gaps information from the user equipment 10 may be implemented through one or more processors, such as a processing circuit 1103 in the second network node 15 depicted in FIG. 11, together with computer program code for performing the functions and/or method actions of the embodiments herein. The program code mentioned above may also be provided as a computer program product, for instance in the form of a data carrier carrying computer program code for performing embodiments herein when being loaded into the second network node 15. One such carrier may be in the form of a CD ROM disc. It is however feasible with other data carriers such as a memory stick. The computer program code may furthermore be provided as pure program code on a server and downloaded to the second network node 15. The second network node may further comprise a memory 1104 configured to store data on, such as capability, DL carriers of different cells or UEs and similar.

Those skilled in the art will also appreciate that the various "circuits" described may refer to a combination of analog and digital circuits, and/or one or more processors configured with software and/or firmware (e.g., stored in memory) that, when executed by the one or more processors, perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

Modifications and other embodiments of the disclosed embodiment(s) will come to mind to one skilled in the art having the benefit of the teachings presented in the foregoing descriptions and the associated drawings. Therefore, it is to be understood that the embodiment(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

Abbreviations 4C 4 Carriers
A-MPR Additional MPR
ANR Automatic neighbor relation
AOA Angle of arrival ARFCN Evolved absolute radio frequency channel number
BCH Broadcast channel
BS Base Station
BSC BS controller
CA Carrier Aggregation
CGI Cell global identifier
CM Compressed Mode
CoMP Coordinated Multiple Point Transmission and Reception
CPICH Common Pilot Channel
CSG Closed subscriber group
DAS Distributed antenna system
DB-DC-HSDPA Dual band dual cell HSDPA
DC-HSUPA Dual cell high speed uplink packet access
DeNode B Donor eNode B
DL Downlink
EARFCN Evolved absolute radio frequency channel number
ECGI Evolved CGI
E-CID Enhanced cell ID
E-SMLC Evolved SMLC
GSM Global System for Mobile Communications
HARQ Hybrid Automatic Repeat Request
HRPD High Rate Packet Data
HSPA High-Speed Packet Access
L1 Layer 1
L2 Layer 2
LMU Location measurement unit
LPP LTE positioning protocol
LPPa LTE positioning protocol annex
LTE Long Term Evolution
MAC Medium Access Control
MDT Minimization of drive tests
MIB Master Information Block
MME Mobility management entity
MPR Maximum power reduction
MSR Multi-standard radio
OFDM Modulation Orthogonal Frequency Division
OFDMA Access Orthogonal Frequency Division Multiple
O&M Operational and Maintenance
OOB Out of band
OSS Operational Support Systems
OTDOA Observed time difference of arrival
PBCH Physical Broadcast Channel
PCI Physical cell identifier
RAT Radio Access Technology
RN Relay node
RNC Radio Network Controller
RRC Radio Resource Control
RRH Remote radio head
RRU Remote radio unit
RSCP Received Signal Code Power
RSRQ Reference signal received quality
RSRP Reference signal received power
RSTD Reference signal time difference
SMLC Serving Mobile Location Center
SON Self Organizing Network
RSSI Received signal strength indicator
SIB System information block
SI System information
UARFCN UMTS absolute radio frequency channel number
UE User Equipment
UL Uplink
UTDOA Uplink time difference of arrival
WCDMA Wideband Code Division Multiple Access

The invention claimed is:

1. A method in a user equipment for acquiring system information relating to a cell in a radio communications network, the cell served by a network node, the method comprising:
   receiving signals on more than one downlink carrier simultaneously;
   creating autonomous gaps on a selected one of said downlink carriers, the selected downlink carrier being determined based on at least one of:
      an indication received from the network node that specifies the selected downlink carrier selected by the network node; and
      a pre-determined rule that specifies the selected downlink carrier; and
   receiving system information transmitted from the cell on the selected downlink carrier using the created autonomous gaps, wherein the system information comprises one or more cell-specific characteristic parameters of the cell for cell identification and/or cell access.

2. The method of claim 1, further comprising sending, to the network node, a selection indication indicating the selected downlink carrier.

3. The method of claim 1, wherein the selected downlink carrier is not associated to a Primary Cell or a serving cell.

4. The method of claim 1, further comprising receiving, from the network node, at least one of the indication and an identity of the cell.

5. The method of claim 1, wherein the pre-determined rule defines the selected downlink carrier to be at least one of:
   a primary carrier;
   a secondary carrier;
   an isolated carrier;
   a carrier determined based on system information type;
   a carrier determined based on gap length of the autonomous gaps; and
   a carrier determined based on density of the autonomous gaps.

6. The method of claim 1, further comprising reporting, to the network node, a capability to create autonomous gaps on any of the downlink carriers out of the more than one downlink carrier, for acquiring system information of a cell.

7. The method of claim 1, wherein the indication indicates different specific downlink carriers for creating autonomous gaps for acquiring different types of system information.

8. The method of claim 1, further comprising reporting the acquired system information to the network node.

9. The method of claim 1, wherein the system information of the cell comprises one or more of:
   a cell global identity;
   a closed subscriber group indicator;
   a hybrid closed subscriber group indicator; and
   a Master Information Block and one or more System Information Blocks.

10. A method in a network node for requesting a user equipment to acquire system information relating to a cell in a radio communications network, the cell served by the network node, the method comprising:
   requesting the user equipment to acquire system information relating to the cell by transmitting an indication to the user equipment, said user equipment capable of receiving signals on more than one downlink carrier simultaneously, wherein the system information comprises one or more cell-specific characteristic parameters of the cell for cell identification and/or cell access;
   wherein the indication specifies a selected one of said downlink carriers selected by the network node on which to create autonomous gaps for the user equipment to receive the system information transmitted from the cell.

11. The method of claim 10, further comprising selecting the downlink carrier on which the user equipment is to create autonomous gaps on for acquiring the system information.

12. The method of claim 11:
wherein the selecting comprises selecting different carriers for retrieving different types of system information; and
wherein the transmitting comprises transmitting indications of the selected different carriers.

13. The method of claim 10, further comprising receiving, from the user equipment, a capability indication indicating capability of the user equipment to create autonomous gaps on any of the downlink carriers of the more than one downlink carrier for acquiring system information of a cell.

14. The method of claim 13, wherein the selecting is based on one of:
the received capability indication;
the received capability indication and an additional criterion.

15. The method of claim 14, wherein the additional criterion comprises at least one of:
a requirement that the downlink carrier that is adjacent to the least number of carriers;
a requirement that the use of the downlink carrier results in least data loss due to autonomous gaps;
a requirement that the downlink carrier is least time critical;
a requirement that the downlink carrier be selected based on gap lengths of the autonomous gaps;
a requirement that the downlink carrier be selected based on gap density of the autonomous gaps;
whether autonomous gaps are distributed over more than one carrier for acquiring system information of more than one cell.

16. The method of claim 10, further comprising requesting the user equipment to report a capability of the user equipment to create autonomous gaps, for acquiring system information of a cell, on any of the downlink carriers out of the more than one downlink carrier.

17. The method of claim 10, wherein the network node is a first network node; wherein the method further comprises sending, to a second network node, at least one of:
a carrier indication indicating the downlink carrier for the user equipment to create autonomous gaps on for acquiring system information of the cell;
a capability indication indicating capability of the user equipment to create autonomous gaps on any of the downlink carriers out of the more than one downlink carrier for acquiring system information of the cell.

18. A method, in a second network node, for handling autonomous gap information from a user equipment or a first network node, wherein autonomous gaps are created by the user equipment for acquiring system information relating to a cell in a radio communications network, the cell is served by the first network node, the method comprising:
acquiring, from the user equipment or the first network node, said user equipment capable of receiving signals on more than one downlink carrier simultaneously, at least one of:
information of a capability of the user equipment to create autonomous gaps on any one of the downlink carriers for receiving system information transmitted from the cell, wherein the system information comprises one or more cell-specific characteristic parameters of the cell for cell identification and/or cell access;
information specifying a selected one of the downlink carriers selected by the first network node on which the user equipment is to create autonomous gaps for receiving system information transmitted from the cell;
using the acquired information to configure a downlink carrier for one or more of:
requesting the user equipment to acquire system information after the handover or cell change;
to configure one or more physical layer parameter depending upon whether autonomous gaps are created or not on a certain downlink carrier for acquiring system information;
selecting configuration parameters related to positioning measurements on a carrier depending upon whether autonomous gaps are created or not on the carrier;
network performance monitoring;
network planning or deployment; and
a radio management task.

19. The method of claim 18, wherein the radio management task comprises selecting one or more of physical layer parameters and configuration depending upon the downlink carrier on which the autonomous gaps are more often created by the user equipment.

20. A user equipment for acquiring system information relating to a cell in a radio communications network, the cell served by a network node, the user equipment comprising:
at least one receiver configured to receive signals on more than one downlink carriers simultaneously;
a creating circuit configured to create autonomous gaps on a selected one of said downlink carriers, the selected downlink carrier being determined based on at least one of:
an indication received from the network node that specifies the selected downlink carrier selected by the network node;
and a pre-determined rule that specifies the selected downlink carrier;
an acquiring circuit configured to receive system information transmitted from the cell on the selected downlink carrier using the created autonomous gaps, wherein the system information comprises one or more cell-specific characteristic parameters of the cell for cell identification and/or cell access.

21. The user equipment of claim 20, further comprising a selecting circuit configured to select the downlink carrier to create autonomous gaps for acquiring the system information of the cell based on at least one of the received indication and the pre-determined rule.

22. The user equipment of claim 21, further comprising:
a transmitter configured to send, to the network node, a selection indication indicating the selected downlink carrier.

23. The user equipment of claim 20, wherein the downlink carrier is not associated to a Primary Cell or a serving cell.

24. The user equipment of claim 20, wherein the receiver is further configured to receive at least one of:
the indication from the network node; and
an identity of the cell.

25. The user equipment of claim 20, wherein the pre-determined rule defines the downlink carrier to be at least one of:
a primary carrier;
a secondary carrier;

an isolated carrier;
a carrier determined based on system information type;
a carrier determined based on gap length of the autonomous gaps; and
a carrier determined based on density of the autonomous gaps.

26. The user equipment of claim 20, further comprising a reporting circuit configured to report, to the network node, a capability to create autonomous gaps on any of the downlink carriers out of the more than one downlink carrier for acquiring system information of a cell.

27. The user equipment of claim 26, wherein the reporting circuit is configured to report the acquired system information to the network node.

28. The user equipment of claim 20, wherein the indication indicates different specific downlink carriers for creating autonomous gaps for acquiring different types of system information.

29. The user equipment according to claim 20, wherein the system information of the cell comprises one or more of:
a cell global identity;
a closed subscriber group indicator;
a hybrid closed subscriber group indicator; and
a Master Information Block and one or more System Information Blocks.

30. A network node for requesting a user equipment to acquire system information relating to a cell in a radio communications network, the network node configured to serve the cell, wherein the network node comprises:
a transmitter configured to transmit an indication to the user equipment requesting the user equipment to acquire system information relating to the cell, said user equipment capable of receiving signals on more than one downlink carrier simultaneously, wherein the system information comprises one or more cell-specific characteristic parameters of the cell for cell identification and/or cell access;
wherein the indication specifies a selected one of said downlink carriers selected by the network node to create autonomous gaps for the user equipment to receive the system information transmitted from the cell.

31. The network node of claim 30, further comprising a selecting circuit configured to select the downlink carrier on which the user equipment is to create autonomous gaps on for acquiring the system information.

32. The network node of claim 31:
wherein the selecting circuit is configured to select different carriers for retrieving different types of system information; and
wherein the transmitter is configured to transmit indications of the selected different carriers.

33. The network node of claim 30, further comprising a receiver configured to receive, from the user equipment, a capability indication indicating capability of the user equipment to create autonomous gaps on any of the downlink carriers out of the more than one downlink carrier for acquiring system information of a cell.

34. The network node of claim 33, wherein the selecting circuit is configured to select downlink carrier based on at least one of:
the received capability indication; and
the received capability indication and an additional criterion.

35. The network node of claim 34, wherein the additional criterion comprises at least one of:

a requirement that the downlink carrier that is adjacent to the least number of carriers;
a requirement that the use of the downlink carrier results in least data loss due to autonomous gaps;
a requirement that the downlink carrier is least time critical;
a requirement that the downlink carrier be selected based on gap lengths of the autonomous gaps;
a requirement that the downlink carrier be selected based on gap density of the autonomous gaps; and
whether autonomous gaps are distributed over more than one carrier for acquiring system information of more than one cell.

36. The network node of claim 30, further comprising a requesting circuit configured to request the user equipment to report a capability of the user equipment to create autonomous gaps, for acquiring system information of a cell, on any of the downlink carriers out of the more than one downlink carrier.

37. The network node of claim 30:
wherein the network node is a first network node;
further comprising a sending circuit configured to send, to a second network node, at least one of:
a carrier indication indicating the downlink carrier for the user equipment to create autonomous gaps on for acquiring system information of the cell; and
a capability indication indicating capability of the user equipment to create autonomous gaps on any of the downlink carriers out of the more than one downlink carrier for acquiring system information of the cell.

38. A second network node for handling autonomous gap information from a user equipment or a first network node, the autonomous gaps created by the user equipment for acquiring system information relating to a cell in a radio communications network, the cell served by the first network node, wherein the second network node comprises:
an acquiring circuit configured to acquire, from the user equipment or the first network node, said user equipment capable of receiving signals on more than one downlink carrier simultaneously, at least one of:
information of a capability of the user equipment to create autonomous gaps on any one of the downlink carrier for receiving system information transmitted from the cell, wherein the system information comprises one or more cell-specific characteristic parameters of the cell for cell identification and/or cell access;
information specifying a selected one of the downlink carriers selected by the first network node on which the user equipment is to create autonomous gaps for receiving system information transmitted from the cell;
a using circuit configured to use the acquired system information to configure a downlink carrier for one or more of:
requesting the user equipment to acquire system information after the handover or cell change;
to configure one or more physical layer parameter depending upon whether autonomous gaps are created or not on a certain downlink carrier for acquiring system information;
selecting configuration parameters related to positioning measurements on a carrier depending upon whether autonomous gaps are created or not on the carrier;
network performance monitoring;
network planning or deployment; and
a radio management task.

39. The second network node of claim 38, wherein the radio management task comprises selecting one or more of physical layer parameters and configuration depending upon the downlink carrier on which the autonomous gaps are more often created by the user equipment.

* * * * *